United States Patent [19]

Nagao et al.

[11] Patent Number: 5,483,313
[45] Date of Patent: Jan. 9, 1996

[54] CAMERA HAVING BUILT-IN MAGNETIC RECORDING AND REPRODUCING APPARATUS INCLUDING A NOVEL RECORD/PLAYBACK HEAD

[75] Inventors: Masaki Nagao, Tokyo; Masaki Tokui, Kanagawa, both of Japan

[73] Assignee: Olympus Optical Co., Ltd., Tokyo, Japan

[21] Appl. No.: 233,936

[22] Filed: Apr. 28, 1994

Related U.S. Application Data

[62] Division of Ser. No. 98,022, Jul. 28, 1993.

[30] Foreign Application Priority Data

| Jul. 31, 1992 | [JP] | Japan | 4-205464 |
| Aug. 26, 1992 | [JP] | Japan | 4-227558 |
| Aug. 26, 1992 | [JP] | Japan | 4-227561 |

[51] Int. Cl.⁶ .................................................. G03B 17/24
[52] U.S. Cl. .................................................... 354/106
[58] Field of Search ................................. 354/105, 106; 360/1, 3, 110, 125

[56] References Cited

U.S. PATENT DOCUMENTS 5,307,100  4/1994  Kubo ........................................ 354/105

FOREIGN PATENT DOCUMENTS 4-134709  5/1992  Japan .

Primary Examiner—Howard B. Blankenship
Attorney, Agent, or Firm—Louis Weinstein

[57] ABSTRACT

A camera of the present invention uses photographic film containing a magnetic information recording portion and has a magnetic head magnetically recording or reproducing data on the magnetic information recording portion when the film is transported. A rotary roller is arranged on an opposite side of the film relative to the magnetic head, sandwiching the film therebetween to press a magnetic recording portion of film against the magnetic head, the roller is disposed near a film travelling quantity detecting member rotating linked with film travelling.

8 Claims, 24 Drawing Sheets

CAMERA HAVING BUILT-IN MAGNETIC RECORDING AND REPRODUCING APPARATUS INCLUDING A NOVEL RECORD/PLAYBACK HEAD

This is a division of application Ser. No. 08/098,022, filed Jul. 28, 1993.

BACKGROUND OF THE INVENTION

1. Field of the Invention

The present invention relates to a camera with a built-in magnetic recording and reproducing apparatus, which can record photographic information and developing treatment in a magnetic recording portion made of magnetic film or reproduce the recorded information.

2. Related Art Statement

In recent years, a camera with a built-in magnetic recording apparatus for recording photographic information or the like in a magnetic recording portion made of magnetic film has been proposed.

Several kinds of structure around the magnetic recording head used in the aforesaid magnetic recording apparatus have been proposed. For example, these apparatuses as disclosed in the official gazettes of Japanese Patent Laid Open Nos. 3-168624/1991, 3-289639/1991, and PCT application (International patent application) No. WO-90/04202 have the structure in which a magnetic head for magnetic recording and a pressure pad are arranged to sandwich film therebetween and face each other and the film is pressed on the magnetic head by the pressure pad at the time of recording.

A magnetic recording apparatus of a camera disclosed in the official gazette of Japanese Patent Laid Open No. 3-200130/1991 has the structure which drives a magnetic head to an operating position at the time of magnetic recording.

Nevertheless, an ordinary pressure pad made of ferrite material applied to the apparatuses disclosed in the aforesaid references has a defect in which the pad is easily worn away or becomes fuzzy by sliding a film end face or perforations into the pad. Further, a film's striking feature is hardening at low temperature in comparison with audio tape, so that the feature is disadvantageous for using the pressure pad. In addition, if film is sandwiched and supported in this way, the film transporting force will increase. Therefore, more electricity is used and especially, winding at low temperature becomes more difficult by increasing the film transporting force. As a matter of course, an electric battery is consumed faster.

Like a camera magnetic recording apparatus described in Japanese Patent Laid Open No. 3-200130/1991, a magnetic head is is moved, so that the reliability might be lowered by cutting a lead because an electric member is driven.

At the same time, in the aforesaid camera using photographic film having a magnetic recording medium of photographic information, a magnetic head whose shape has been used for a recorder is now used. The shape is approximately a rectangular parallelopiped and long in the optical axis direction. In the magnetic head shape, the front having a gap portion is formed as an arc surface bending in the film travelling direction.

The structure of a magnetic head which has been used will be explained as follows. In principle, a magnetic head is made of a ring-shaped iron core (hereinafter, core) and an operation coil wound on the core. The core is formed of magnetic materials including permalloy, ferrite and sendust. Required characteristics of the magnetic materials of the core include 1) high magnetic permeability,
2) high saturation magnetic flux density,
3) small holding power,
4) strong resistivity, and
5) high hardness and good processability.

An operation coil is wound on a part of the core. The core and coil are stored in a shield case. Both ends of the operation coil are connected to a terminal, which is insulated and arranged in such a way that the terminal is projecting from the inside of the shield case to the outside, and further connected to an external circuit by its external projecting terminal. Additionally, the structure of the core is determined also in consideration of the efficiency of the magnetic circuit.

FIGS. 38(a)–38(d) show an assembly order of a magnetic head using a former ferrite core. A core 302 of a magnetic head 301 shown in FIG. 38(c) consists of a front core 303 shown in FIG. 38(a) and a back core 304 shown in FIG. 38(b). An operation coil 305 is wound on the back core 304 and then, a bonding surface 303a of the ground front corn 303 and a bonding surface 304a of the ground back core 304 are bonded together to from a unitary structure as shown in FIG. 38(c).

At this moment, the bonding surfaces 303a and 304a stick together, so that an air gap between the bonding surfaces is decreased as small as possible. Then, these cores are stored in a shield case 301a as shown in FIG. 38(d) and the shield case 301a is filled with an adhesive agent or the like to seal the cures 30: in case 301a. However, the magnetic head 301 shown in FIG. 38 is composed, as a head, of two magnetic heads for recording and for reproducing, respectively.

FIG. 39 shows flow of magnetic flux in a core 308 of a magnetic head when information is magnetically recorded in a magnetic recording medium 307 on film 306 by a former magnetic head formed as stated above.

The core 308 is made of a strong magnetic substance, such as permalloy as stated above. When information current flows in an operation coil 309 wound on the core 308, magnetic flux φ c is generated and flows in the core 308 as shown by dotted lines. In a section of the core 308 to be magnetically recorded, a slit-like air gap portion 308a is formed. Actually, a thin metallic foil of non-magnetic substance is put in the air gap and fixed. Because magnetic resistance in a magnetic circuit is high in the air gap portion 308a of the core 308, the magnetic flux φ c which is flowing in the core flows by branching out into a magnetic flux route φ a spreading the outside of the core, a magnetic flux route φ b flowing across the air gap portion 308a, and magnetic flux φ e passing though the inside of the core. Among these branched magnetic flux, the magnetic recording medium 307 of the film 306 is magnetically recorded by the magnetic flux φ a. An important point in the design of the shape of the core is how much of the magnetic flux φ a is transmitted and how effectively the magnetic flux φ a is transmitted.

Therefore, the shape of the former core is approximately a square. However, in order to choose not only magnetic material of the core but also To reduce the cross-sectional area of the core for transmitting required magnetic flux and leak magnetic flux φ d which is not used for recording as small as possible, it is necessary to make a size D between facing parts of the core 308 long enough and to make a space enough for a coil wound on the core to increase the wound number of windings of the coil. Accordingly, it is unavoidable that a former core is formed into the aforesaid square shape and becomes longer in the optical axis direction lying at right angles to the travelling direction of the magnetic recording medium.

Further, film having a magnetic recording medium to be loaded in a camera is used. On the film, emulsion of silver salt is applied on a surface on a photographic lens side of base material formed of acetate or the like and a magnetic recording medium is applied on a surface of a pressure plate side at the back of the base material. Thus, in order to press and bring a magnetic recording and reproducing head into contact with a magnetic recording medium of film, it is necessary to arrange the head at the rear of film which is put on the side of a photographer of a camera. If a magnetic head having a former core of a square-shape is arranged on the rear of film of a camera, the camera has a defect of becoming thicker, having difficulty in gripping, and therefore, being hard to be operated.

Therefore, it can be proposed to make a magnetic head flat while the former square-shaped structure is used. FIG. 40 shows the structure of the flat-shaped magnetic head. FIG. 41 shows the outward appearance of a magnetic head 310 having the structure shown in FIG. 40.

A core 311 of the magnetic head 310 is formed of thin U-shaped cores having cross-sectional areas required for transmitting specified magnetic flux. A gap portion 311a required for magnetic recording is composed of a pair of the cores 311. An operation coil 312 is wound on each core. The core is stored in a shield case and fixed to the case as a unit by glue. The air gap portion 311a arranged at the center of the cores 311 is formed so as to be in contact with a magnetic recording medium 314 on film 313. An air gap portion 311b is formed on the opposite side of the air gap portion 311a of the core 311.

In the magnetic head 310 formed in this way, when information signal currents flow in the two coils 312 wound on the cores 311 to produce a magnetic field, most magnetic flux originated from the N Pole side of the coil flows in the core 311 as shown by the dotted flux lines $\phi$ c. Due to the high magnetic reluctance of the air gap portion 311a, the magnetic flux $\phi$ c flowing in the core is divided into a magnetic path of magnetic flux $\phi$ a going by a roundabout route like an arc on the side of the magnetic recording medium, a magnetic path of magnetic flux $\phi$ b approaching a surface that the core faces, and a magnetic path of magnetic flux $\phi$ e going by a roundabout route like an arc in the inside of core in the air gap portion 311a. The aforesaid magnetic flux reaches the S Pole side of the coil. A magnetic recording medium is magnetically recorded by the magnetic flux $\phi$ a passing through the magnetic path on the side of the aforesaid magnetic recording medium within the magnetic path of the air gap portion.

Nevertheless, as shown in FIGS. 40 and 41, if a core is made to be flat, there is a problem in which not only the magnetic paths where the magnetic flux $\phi$ a, $\phi$ b, and $\phi$ e pass become larger but also the leak magnetic flux $\phi$ d becomes larger. The leak magnetic flux $\phi$ d returns to the coil before reaching the air gap portion 311a and is not used for magnetic recording in the magnetic recording medium. Therefore, the leak magnetic flux $\phi$ d remarkably lowers the magnetic head efficiency. The leak magnetic flux $\phi$ d becomes larger when a size D1 is made to be smaller an approach to the flux $\phi$ d.

As shown in FIG. 40, if the core of the magnetic head is changed to be a flat-shape while the core of the magnetic head has the former structure, the leak magnetic flux increases, so that problems are developed: specified characteristics cannot be obtained and a space for storing the coil cannot be secured.

A magnetic head needs positioning at the rear of film when the head is loaded in a camera. It is very important that a magnetic head is made to be a flat-shape (thin-shape) for providing a small camera.

As disclosed in the PCT application No. WO90/04202, it is known that a magnetic head is provided on film pressure plate as a magnetic recording and reproducing head in a camera which uses photographic film with a magnetic information recording portion. As described in Japanese Patent Laid Open No. 3-200131/1991, it is known that a magnetic head is provided so as to be able to retreat against a magnetic information recording portion of film and brought into contact with the magnetic: information recording portion only when information is recorded and reproduced.

However, in the magnetic head disclosed in the PCT application No. WO90/04202, a part of the magnetic head enters a photographic picture plane, so that a film surface, especially in a picture plane might be damaged. Also, in the magnetic head described in Japanese Patent Laid Open No. 3-200131/1991, because the magnetic head is operated to touch or not touch film, a film surface might be damaged with the operation.

OBJECTS AND SUMMARY OF THE INVENTION

The first object of the present invention is to provide a camera in which a magnetic head is pressed on a magnetic recording medium so as to be able to transport film smoothly with little travelling resistance on film and in which a pressing mechanism of a magnetic head having excellent wear and abrasion resistance is contained.

The second object of the present invention is to provide a small camera in which a magnetic head having structure of a flat-shaped magnetic recording and reproducing head without lowering magnetic performance is contained and whose maneuverability is not different from that of a former camera.

The third object of the present invention is to provide a camera in which a magnetic head can be prevented from being damaged by putting a magnetic head in contact with film and from being worn by touching film perforation, and in which instability of contact on a magnetic recording surface of the magnetic head can be prevented.

A first camera of the present invention uses photographic film with a magnetic information recording portion and has a magnetic head which magnetically records or reproduces data in the magnetic information recording portion when the film is transported. To press the magnetic recording portion of the film on the magnetic head, a rotary roller is set on the opposite side of the magnetic head across the film. Then, the roller is arranged near film travelling quantity detecting member which rotates linked with film travelling.

A second camera of the present invention uses photographic film with a magnetic information recording portion and has a magnetic lead which presses on and brings the film into contact with the magnetic information recording portion when the film is transported. The magnetic head magnetically records or reproduces data. In the magnetic head, a front core part forming a gap portion for magnetically recording and reproducing is connected to a back core part wound by a coil in which signal currents for magnetic recording or reproducing flow. The side shape of the front core part and back core part is an approximately L-shape viewed from the travelling direction of a film sheet.

A third camera of the present invention uses photographic film with a magnetic information recording portion and has a magnetic head which presses on and brinks the film into contact with the magnetic information recording portion when the film is transported. The magnetic head magnetically records or reproduces data. A cover case of the magnetic head slopes in the separating direction from the film so that at least a part except for a surface facing the magnetic information recording portion does not touch a photographic picture plane of the film on a surface facing the film.

The other characteristics and advantages of the present invention will be apparent enough from the following explanation.

DETAILED DESCRIPTION OF THE PREFERRED EMBODIMENTS

Embodiments of the present invention will be explained making reference to the drawings.

Figure 1:
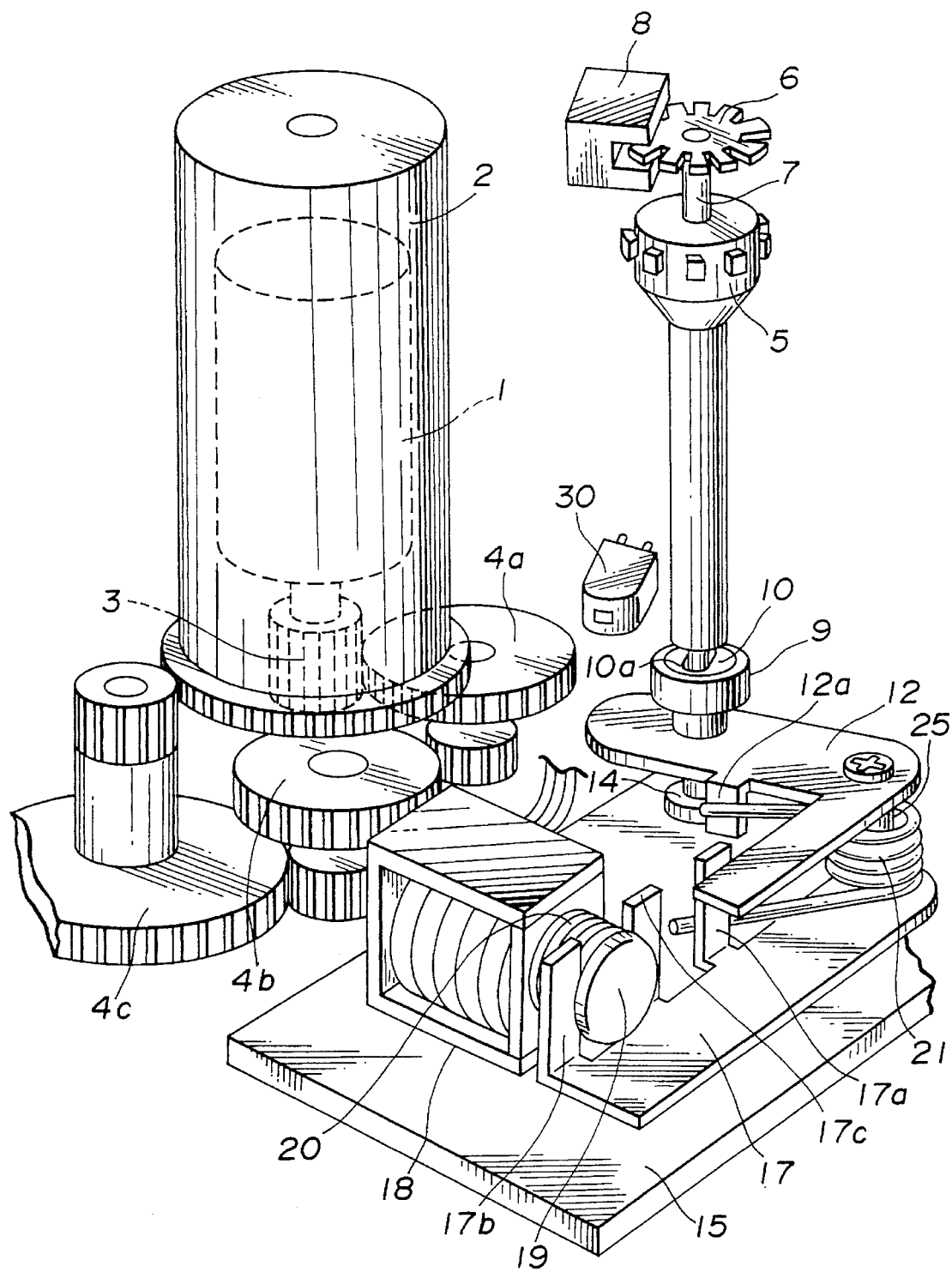
FIG. 1 is a perspective view of a camera winding mechanism portion and magnetic recording mechanism portion showing a first embodiment of the present invention.

FIG. 1 is a perspective view of a winding mechanism portion and a magnetic recording mechanism portion of a camera showing the first embodiment of the present invention. The camera uses photographic film with a magnetic information recording portion. In the camera, when the film is transported, the magnetic head is pressed on the magnetic information recording portion and data can be magnetically recorded or reproduced.

The winding mechanism portion forming the camera is a known mechanism portion of a spool drive consisting of a spool portion and a sprocket portion.

As shown in FIG. 1, the spool portion comprises a motor 1 for transporting film, a spool 2 for winding film, a pinion gear 3 fixed on an output axis of the motor 1, and reduction gear rows 4a, 4b and 4e for driving the spool 2.

In the spool portion, film is auto-loaded by signals in a winding driving circuit (not illustrated) or the motor 1 is driven on the basis of film transporting signals in response to photographing, so that the film is advanced.

The sprocket portion is formed of a driven sprocket 5 engaged with film perforations and rotated in accordance with film transportation, a sprocket axis 7 having the same axis of the sprocket 5 and rotating with the sprocket 5 as a unit, a slit plate 6 fixed on the sprocket axis 7 as an unit, and a photo-interrupter 8 electrically detecting the rotation quantity of the sprocket 5 as pulse signals to control film transportation.

The upper part of the sprocket 5 is engaged with perforations and has gear teeth arranged so that the interval between the perforations equals to the rotation quantity. The lower part of the sprocket 5 is narrow so as not to touch and damage an emulsion surface of film on a photographic picture plane part. Additionally, in the part below the lower part, the sprocket axis 7 goes through an elongated hole 10a of a roller axis 10 stated later and supported by a bearing 14 calked and fixed on a base 15. The base 15 is screwed in a specified position of the camera unit.

The magnetic recording mechanism portion comprises the roller axis 10 fixed to a first switching lever 12 stated later, a rotary roller 9 rotatably supported by the roller axis 10, the first switching lever 12 rotatably supported by the base 15, a second switching lever 17, an applying force torsion spring 21 of the levers 12 and 17, a solenoid 18 screwed on the base 15, a movable iron core 19, a returning spring 20 of the movable iron core 19, and a magnetic head 30 fixed on a back cover of a camera which is not illustrated.

In the camera of the present embodiment, a magnetic head having former construction is used; however, a similar type of a magnetic head 201 having the construction shown in FIG. 29 stated later can be loaded.

Figure 2:
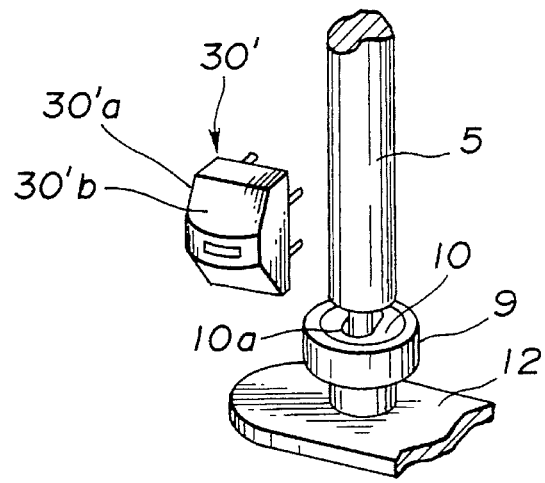
FIG. 2 is a perspective view of a main part of a magnetic recording mechanism portion when a magnetic head having other construction is loaded in a magnetic recording mechanism portion of a camera in FIG. 1.

FIG. 2 is a perspective view around a magnetic recording mechanism portion in which a magnetic head 30' similar to the magnetic head 201 is loaded. The magnetic head 30' has a sloping surface 30'b slanting to the direction separated being from film on a cover case 30'a so as not to touch a photographic picture plane portion of the film. Because the head 30' is applied, a camera can be miniaturized and a film surface can be prevented from being damaged by the magnetic head.

Figure 3:
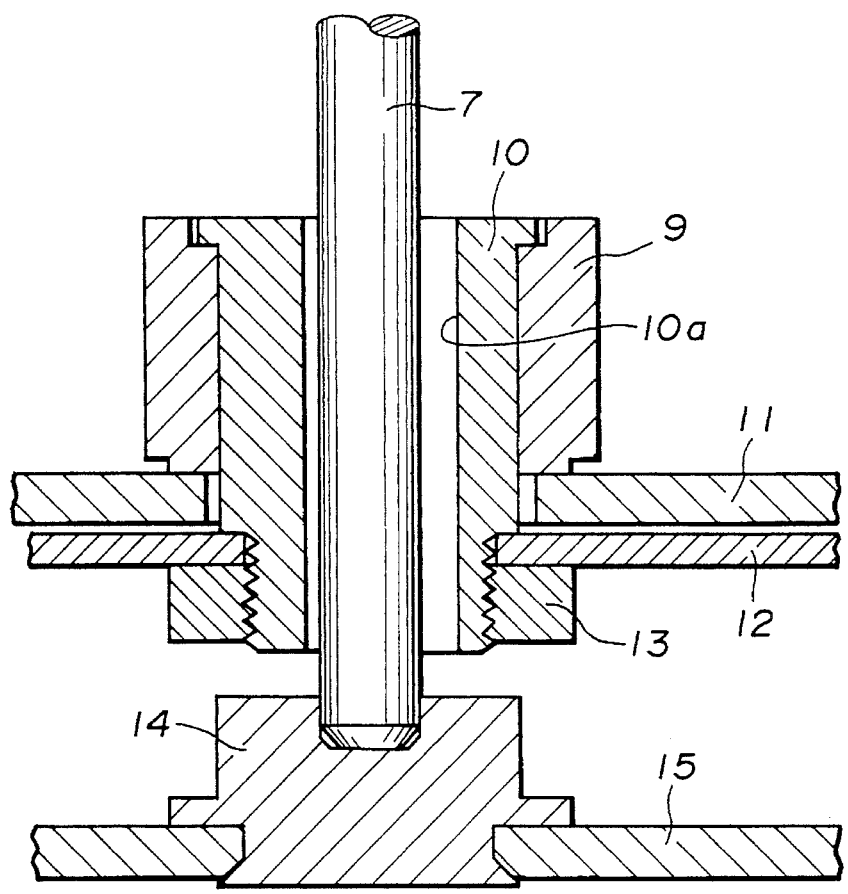
FIG. 3 is a sectional view of a region around a rotary roller in a winding mechanism portion of a camera in FIG. 1.

FIG. 3 is a sectional view of the region around the sprocket axis. In FIG. 3, the rotary roller 9 is rotatably loaded in the roller axis 10 and down movement of the rotary roller 9 is controlled by a camera unit 11. The camera unit 11 has camera structure formed of aluminum die-cast and plastic forming materials.

On a lower part of the roller axis 10, a screw part is arranged. The roller axis 10 is fixed to a screw part with a nut 13 so as to sandwich the first switching lever 12. In a part engaged with a sprocket axis 7 of the roller axis 10, the elongated hole 10a is bored as mentioned above, so that the rotary roller 9 can move without touching the sprocket axis 7 even when the first switching lever 12 is switched and rotated around a rotary axis 23 as will be explained later.

Figure 4:
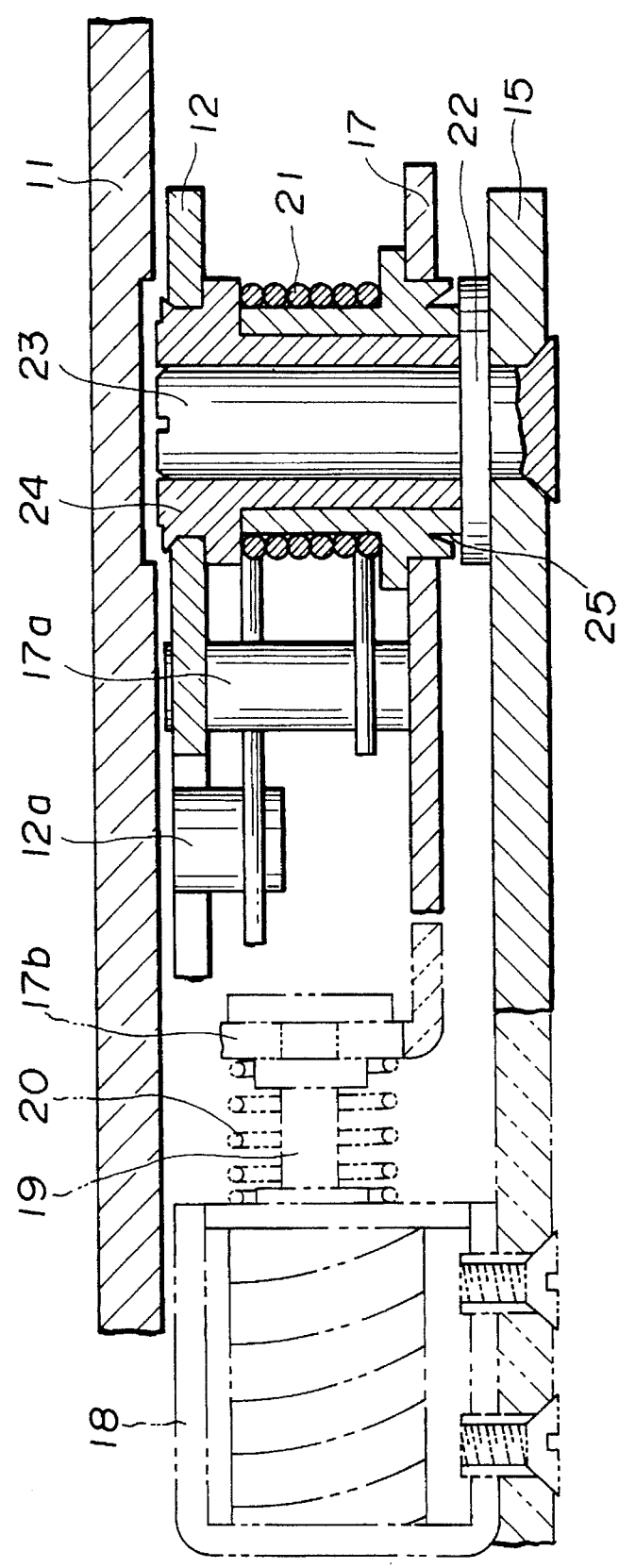
FIG. 4 is a sectional view of a region around a solenoid in a magnetic recording mechanism portion and a switching lever of a camera in FIG. 1.

Next, the operation of the first and second switching levers 12 and 17 will be explained using FIG. 4, a sectional view of the region around the solenoid and switching levers.

A supporting axis 23 having a flange 22 is calked and fixed on the base 15. A sleeve-like bearing 24 is calked and fixed to the first switching lever 12. At the same time, a sleeve-like bearing 25 is calked and fixed to the second switching lever 17. Then, the bearing 24 is rotatably fitted into the supporting axis 23. The bearing 25 is rotatably fitted into the bearing 24. In addition, a torsion spring 21 is inserted into the periphery of the bearing 25.

A downward bending portion 12a is fitted to the first switching lever 12 and an upward bending portion 17a which is also fitted to the second switching lever 17. Force is applied to the torsion spring 21 in the direction in which a spring hook of the spring 21 repels both directions. The spring hook is hung between the bending portions 12a and 17a. The spring hook applies force rotatably to the switching levers 12 and 17 (see FIG. 1).

On the second switching lever 17, two additional bending portions 17b and 17c (see FIG. 1) are arranged. The bending portions 17b and 17c receive the movable iron core 19 of the solenoid 18 between them with a little backlash. A compression spring 20 is arranged between the bending portions 17c and 17b of the second switching lever 17 and the yolk of the solenoid 18 to apply force to the movable iron core 19 in the projecting direction and the second switching lever 17 in the counter-clockwise direction.

Figure 5:
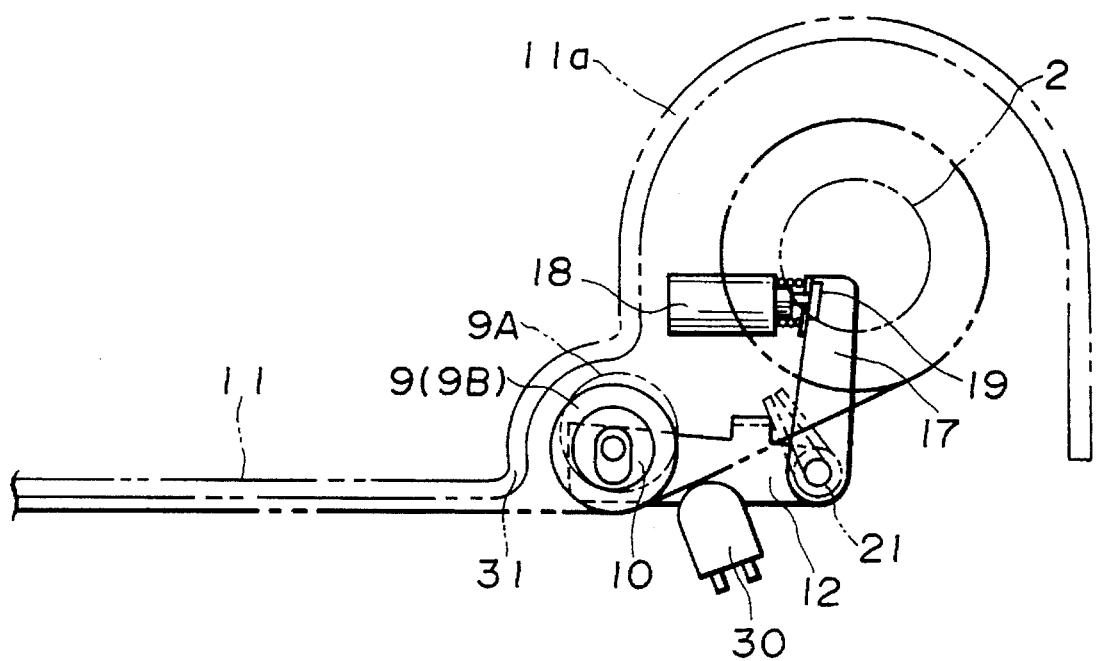
FIG. 5 is a transverse sectional view showing a part of a winding mechanism portion and a magnetic recording portion of a camera in FIG. 1.

FIG. 5 is a transverse sectional view of the winding mechanism portion and the magnetic recording mechanism portion.

A film winding compartment 11a is provided in the camera unit 11. Film is advanced in such a way that film 31 is wound on the spool 2 arranged in the film winding compartment 11a. In the sectional view of FIG. 5, an approximate position of a driving mechanism of the rotary roller 9 is perspectively illustrated to explain the operation understandably.

The magnetic head 30 is arranged on a back cover or a supporting member of a film pressure plate (not illustrated) and correctly maintained in a specified position by closing the back cover. FIG. 4 shows a state when the movable iron core 19 is sucked towards the left and the rotary roller 9 moves to a magnetically recording and reproducing preparation position and a magnetic recording portion of the film 31 is pressed against the magnetic head 30 by specified pressing force of the roller 9.

The operation of the winding mechanism portion and the magnetic recording mechanism portion of the camera in this embodiment formed as stated above will be explained using FIG. 1.

The force of the spring 20 is applied to the second switching lever 17 so as to rotate in the counter-clockwise direction at the time of ordinary photographing except for the time of magnetic recording. The force rotates the first switching lever 12 until the elongated hole 10a of the roller axis 10 touches the sprocket axis 7 through the bearing 25 and the first switching lever 12. As a result, the rotary roller 9 moves back to a position 9A in FIG. 5. The film 31 moves with the position of the rotary roller 9. A small gap is formed between the film 31 and the magnetic head 30, so that pressing force is lost.

When photographic operation is completed and just before the film is transported, the solenoid 18 performs suction operation by making contact to a solenoid driving circuit (not illustrated) as preparation operation for magnetically recording data on film. By the operation, the movable iron core 17 is sucked against the compression spring 20. Then, the second switching lever 17 is rotated in the counter clockwise direction in FIG. 5 by the suction. Force is further applied to the torsion spring 21 in the applying force direction and then, the switching lever 12 is rotated in the counter-clockwise direction in FIG. 4. Thus, the position of the rotary roller 9 rotates in the counter-clockwise direction in FIG. 5 and moves to a (solid-line) position 9B. As a result, film 31 moves in the direction of pressing the magnetic head 30. At the moment, an opening is produced between the elongated hole 10a of the roller axis 10 supporting the rotary roller 9 and the sprocket axis 7 and the position of the rotary roller 9 is determined correctly when the roller 9 is moved. In this state, film transportation starts and magnetic recording and reproducing is carried out.

Although it is not illustrated in this embodiment, the position of the roller 9 which is moved by the solenoid 18 is precisely adjusted by a stopper such as an eccentric pin, bringing the first switching lever 12 be in contact with the eccentric pin whose position is previously determined. In this way, the positions of the film 31 and the magnetic head 30 are precisely determined by position adjustment and dispersion of the pressed states is removed.

It is desirable that the position in which the rotary roller 9 moves for magnetic recording is a diameter of the teeth root of the driven sprocket 5 near the position to which film touches the roller to guide travelling, because it prevents film from becoming a shape of a bamboo shoot when the film is wound on the spool.

Electricity to the solenoid 18 is turned off at the end of film transportation. After that, the second switching lever 17 rotates in the counter-clockwise direction by the force applied by the spring 20. Then, the rotary roller 9 rotates until the elongated hole 10a of the roller axis 10 comes in contact with the sprocket axis 7, and then, the roller 9 is retreated. Therefore, the magnetic head 30 and the film 31 are separated.

As stated above, frictional resistance during film transportation can be reduced by switching the pressed state between the magnetic head 30 and the film 31. In the present embodiment, a suction type solenoid 18 is provided as a driving source for moving the rotary roller 9. If a latch type solenoid in which a permanent magnet and an electric magnet are combined is used, consumed electricity during film transportation can be further reduced.

Additionally, magnetic recording and reproducing is performed with the winding transportation of the film 31 in this embodiment; however, as another method, the solenoid 18 and the driving mechanism may be controlled in such a way that once all the photographic recording information is stored in memory means at photographing and magnetically recorded in a position corresponding to each photographic frame linked with rewinding of the film 31.

Next, a camera showing the second embodiment of the present invention will be explained. The construction of the rotary roller of the magnetic recording mechanism portion of this embodiment is different from that of the first embodiment. Since the other construction is the same as that of the first embodiment, reference numerals of the other construction will be explained using the same numerals.

Figure 6:
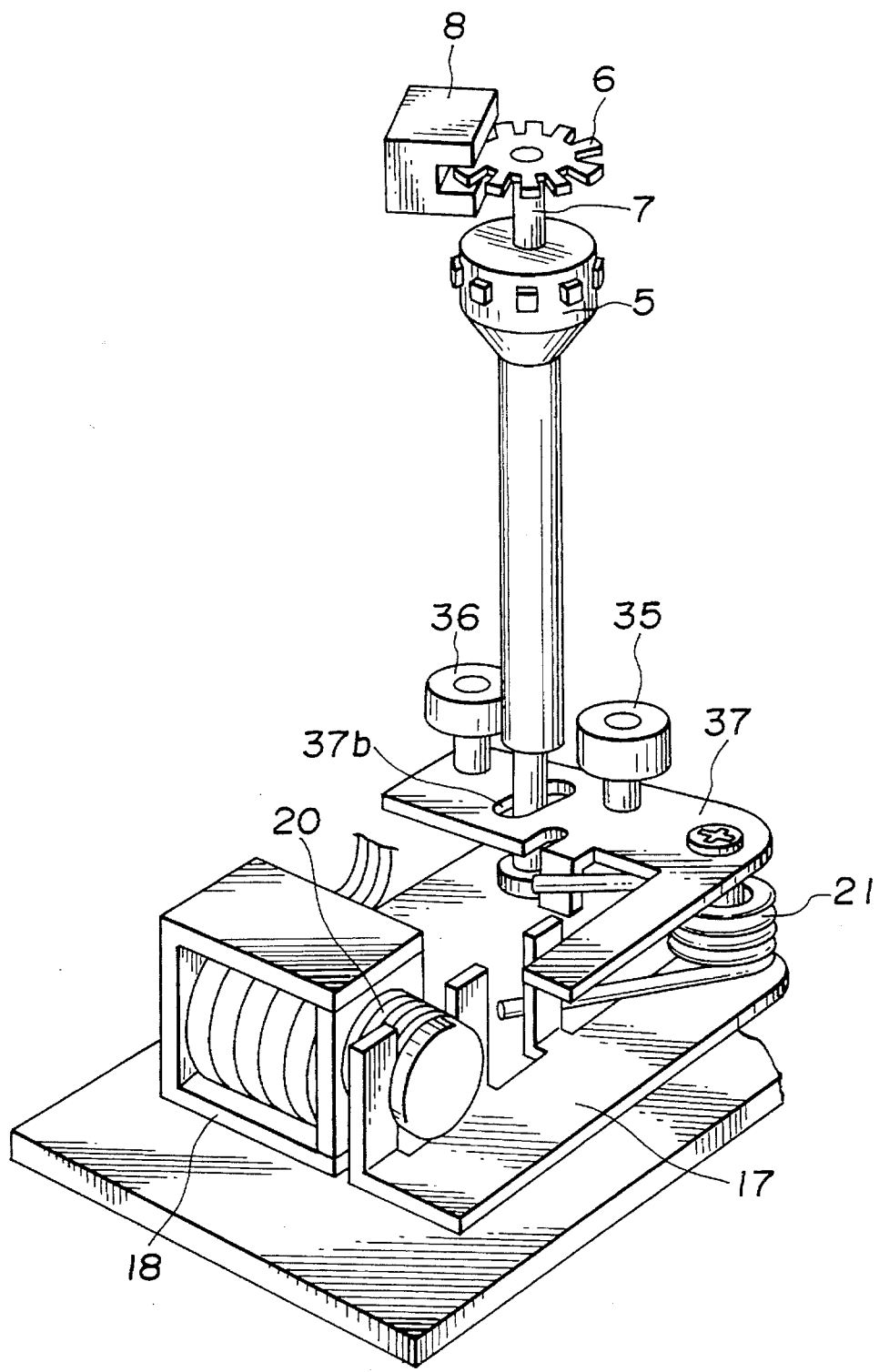
FIG. 6 is a perspective view showing a sprocket portion and a magnetic recording mechanism portion of a camera in a second embodiment of the present invention.

FIG. 6 is a perspective view of a sprocket portion and a magnetic recording mechanism portion viewed from the front of a camera in the second embodiment. On a first switching lever 37 in the magnetic recording mechanism portion of the embodiment, a first rotary roller 35 and a second rotary roller 36 are arranged and an elongated hole 37b in which the sprocket axis 7 is inserted is bored.

Figure 7:
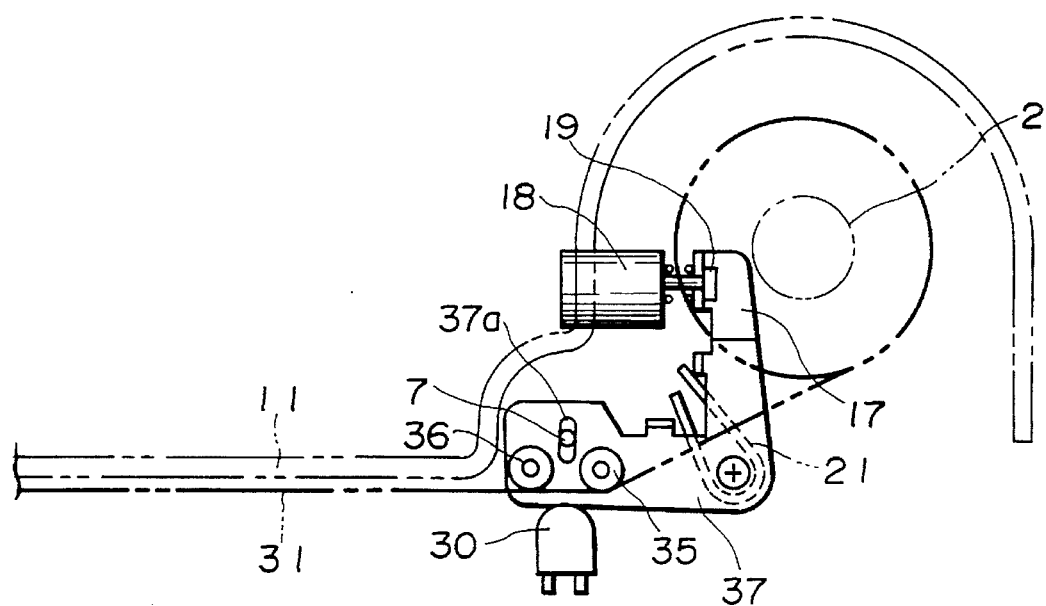
FIG. 7 is a transverse sectional view showing a winding mechanism portion and a magnetic recording mechanism portion of a camera in FIG. 6.

FIG. 7 is a transverse sectional view of a winding mechanism and a magnetic recording mechanism portion of the camera. As shown in FIG. 7, a magnetic head 30 is arranged between two rotary rollers 35 and 36 in such a way that the head 30 touches two rollers.

In the camera formed as mentioned above, when electricity is supplied to the solenoid 18 for suction operation by magnetic recording preparation operation during an operation sequence of the camera, a second switching lever 17 rotates in the counter-clockwise direction in FIG. 7 and the first switching lever 37 is also rotated in the counter-clockwise direction through the force applied by a spring 21. As a result, the rotary rollers 35 and 36 rotate in the counter-clockwise direction, so that film 31 is pressed against the magnetic head 30. When the pressing operation is completed, film transportation starts. Then, the magnetic recording signals are transmitted to the magnetic head 30 and the film 31 is magnetically recorded corresponding to a specified photographic frame. This operation may be also a magnetic reproducing process.

After the magnetic recording and reproducing is performed in this way, when specified rotation quantity is detected by rotation quantity detecting signals of a known sprocket 5, film transportation stopping signals are generated. When the film transportation stops, electricity for suction in a solenoid 18 is turned off. A movable iron core 19 which loses magnetic suction force moves in the projecting direction by the force applied by the spring 20. The second switching lever 17 rotates in the clockwise direction in FIG. 6 and the rollers 35 and 36 rotate in the clockwise direction with the rotation of the first switching lever 37, as well. Then, pressing force between the film 31 and the magnetic head 30 is released.

As stated above, according to the magnetic recording mechanism portion of the camera of the embodiment, the film 31 is moved in the magnetic head direction by the aforesaid two rotary rollers. Therefore, the pressed state of the magnetic head 30 on the film surface 31 is stabilized and improper recording and reproducing operation is hard to be produced and film is transported more smoothly.

Next, a camera showing the third embodiment will be explained using FIGS. 8 to 16.

Figure 8:
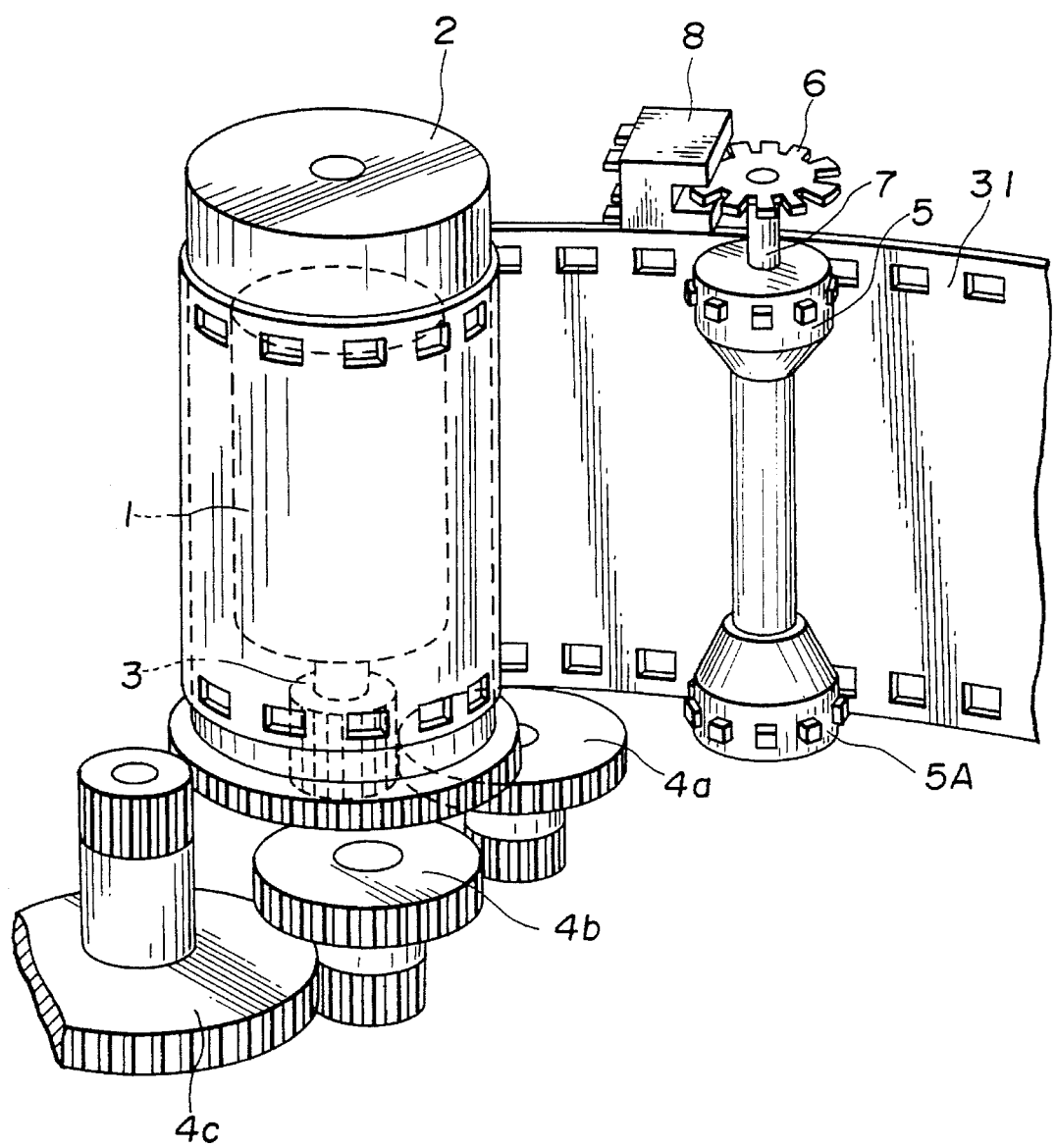
FIG. 8 is a perspective view showing a winding mechanism portion of a camera of a third embodiment of the present invention.
Figure 9:
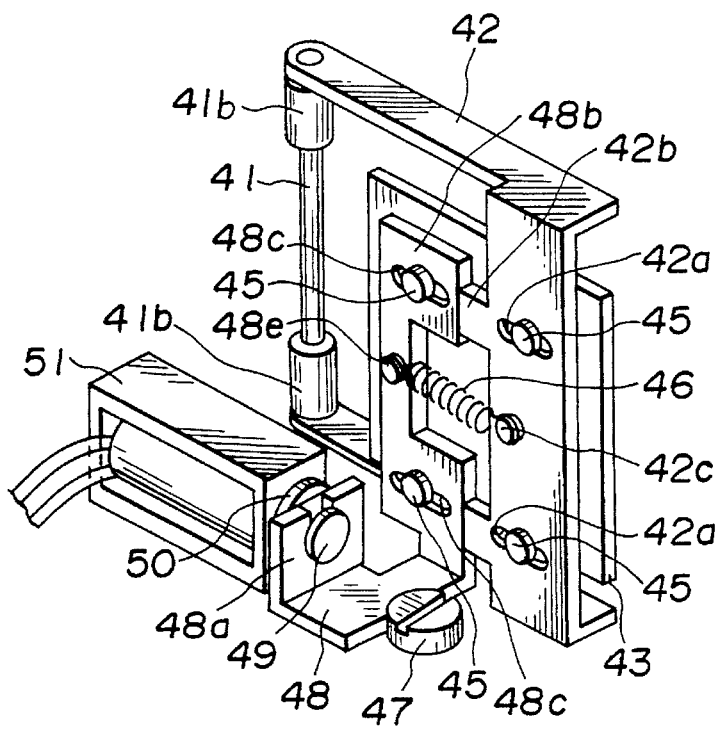
FIG. 9 is a perspective view showing a magnetic recording mechanism portion of a camera in FIG. 8.

FIG. 8 is a perspective view of a winding mechanism portion of the camera. FIG. 9 is a perspective view of a magnetic recording mechanism portion of the camera of the embodiment. In the magnetic recording mechanism portion, a rotary roller portion and a magnetic head are arranged on a film transportation path between a patrone compartment and a photographic aperture part.

As shown in FIG. 8, the winding mechanism portion has the same construction as that of the first embodiment. Specifically, a spool portion of the winding mechanism portion comprises a film transporting motor 1, a film spool 2 for winding film 31, a pinion gear 3 of the motor 1, and reduction gears 4a, 4b and 4c. The reduction gear 4c among the gears is engaged with a driving gear of the spool 2. The film 31 is auto-loaded by signals of winding drive circuit (not illustrated). The motor 1 is driven on the basis of the film transporting signals responding to photographing and the film 31 is transported.

A sprocket portion comprises a driven sprocket 5 engaged with film perforations and rotated in accordance with film transportation, a driven sprocket 5A having the same axis of the sprocket 5 and rotating with the rotation of the sprocket 5 as an unit, a sprocket axis 7, a slit plate 6 fixed on the sprocket axis 7a an unit, and a photo-interrupter 8 electrically detecting transportation quantity of each frame by electrically detecting rotation quantity as pulse signals for computing and controlling auto-load transportation quantity or film transportation quantity when film is rewound. Also, the winding mechanism is a known spool drive mechanism.

The upper part of the sprocket 5 has gear teeth arranged so that rotation quantity corresponds with an interval of perforations to be engaged with the perforations. The lower part of the sprocket 5 is narrow so that a film emulation surface is not damaged by touching the surface. Further, the part below the lower part of the sprocket axis 7 is rotatably supported.

As shown in FIG. 9, on the magnetic recording mechanism portion, a rotary roller 41 containing rotary contact portions 41a and 41b, which have thick diameters upward and downward, include narrow axis end pares at the upper and lower ends. The upper and lower ends are supported by a distal end of a first operation plate 42 which works as a bearing and switching lever. The first operation plate 42 is provided with two elongated holes 42a and two projecting portions 42b at the center. At the same time, a pin 45 is calked and fixed to a base 43, which is fixed to a camera unit through the elongated hole 42a of the first operation plate 42. The first operation plate 42 is slidably supported along the base 43.

A second operation plate 48 is slidably supported by the pin 45 on the base 43 through an elongated hole 48c provided on a vertical part 48b. Additionally, on the second operation plate 48, a fork-shaped notch part is formed in a bending part 48a. A movable iron core 49 of the solenoid 51 is fitted into the notch part with a little backlash so as not to be dropped. An eccentric pin 47 for adjusting a releasing operation position when a solenoid 51 facing the second operation plate 48 is off is provided in the camera unit. For structure, such as a base and a camera unit, the eccentric pin 47 can be rotated by a definite force but fixed by force in which the pin 47 does not rotate easily. Also, the pin 47 may be fixed across a washer by a calking and fixing method.

The solenoid 51 is also fixed to structure, such as a base of a camera unit which is not illustrated. Although the solenoid 51 sucks a movable iron core 49 by making contact, a compression spring 50 is sandwiched between the yolk of the solenoid 51 and a bent part 48a of the second operation plate 48, and then, force is applied to the second operation plate 48 in the lower right direction in FIG. 9.

Spring fitting pins 42c and 48e are calked and fixed to near the center across two elongated holes 42a and 48c of the first operation plate 42 and the second operation plate 48 and a pulling spring 46 is hung so as to pull the operation plates 42 and 48 with toward other.

Figure 10:
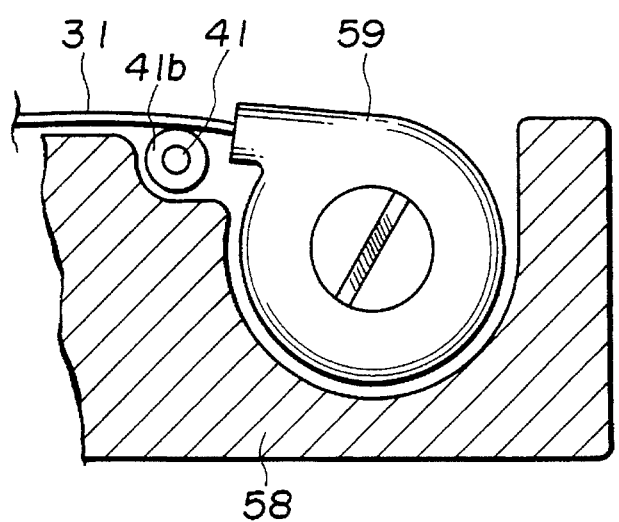
FIG. 10 is a sectional view of an operation state showing a rotary roller in a magnetic recording mechanism portion of a camera in FIG. 8 which is projecting over a film side.

FIG. 10 is a sectional view showing an operation state in which the rotary roller 41 is driven in the upper left direction in FIG. 9 and a rotary roller contact portion 41b is projecting over a film side.

Figure 11:
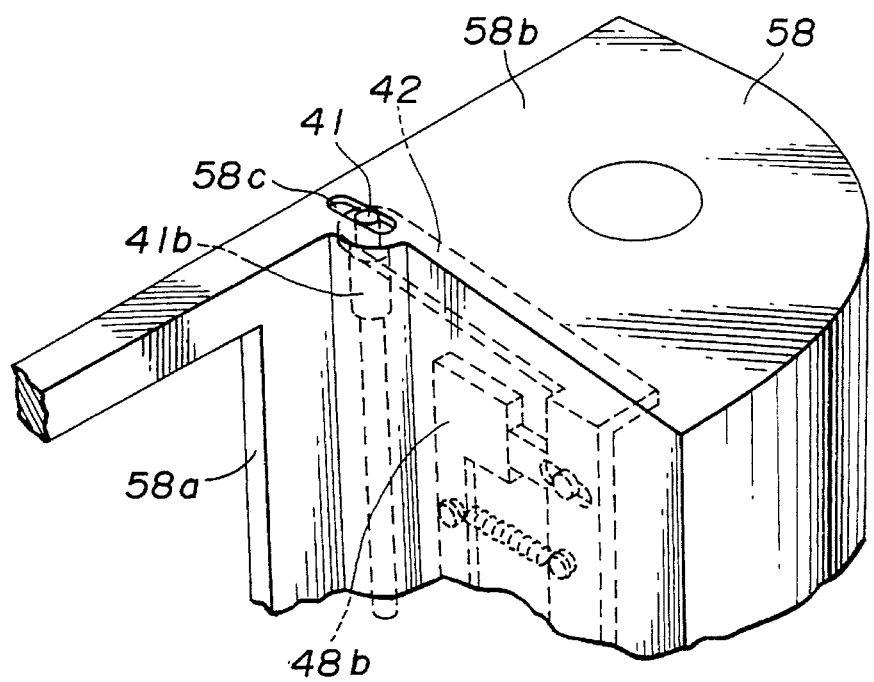
FIG. 11 is a perspective view showing a part of a state in which a magnetic recording mechanism portion is fitted to a camera unit of a camera in FIG. 8.

FIG. 11 is a perspective view of a state in which the magnetic recording mechanism portion is fitted to a camera unit 58. The base 43 (not shown in FIG. 11) is screwed to a surface on a side of a photographic aperture 58a on an outer wall of a patrone storing compartment of a camera. An elongated hole 58c is bored in an upper surface of outer wall 58b of the patrone compartment so as not to interfere with an operation range of an axis end part of the rotary roller 41. It is desirable to make elongated hole 58c a size as small as possible to prevent light entrance on a film travelling path.

The first operation plate 42 supporting an axis part of the rotary roller 41 which passes through the hole 58c is arranged along the upper surface of the outer wall of the patrone compartment. A similar elongated hole is provided on the bottom of the patrone compartment so as not to control the operation of the roller 41. In this way, a contact portion 41b of the roller 41 is exposed on the film travelling path. The other driving mechanism can be arranged in positions which cannot be seen from the outside.

Figure 12:
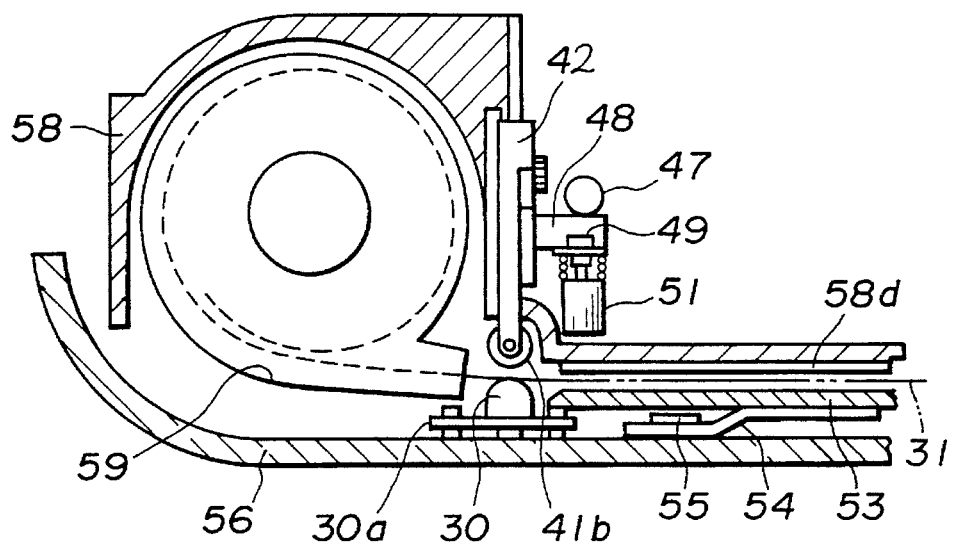
FIG. 12 is a transverse sectional view showing a state in which a rotary roller in a magnetic recording mechanism portion of a camera in FIG. 8 is retreating.

FIG. 12 is a transverse sectional view showing a state in which the rotary roller 41 in the magnetic recording mechanism portion is retreated.

In FIG. 12, a patrone 59 is loaded in the patrone compartment of the camera unit 58, and the film 31 is drawn out. The rotary roller 41 is arranged in a position facing the magnetic head 30 across the film 31. The roller 41 is provided near an entrance of a film patrone 59.

Generally, in a patrone compartment, a phenomenon in which quantity of pulling force of the film 31 is remarkably increased has occurred, because a patrone rotates around a patrone axis in the counter-clockwise direction and fastens film 31 between a patrone entrance and camera unit structure by frictional resistance originated by felt for shielding light at the patrone entrance or the like. To improve the phenomenon, the rotary roller 41 is placed near the patrone entrance from which film is drawn to control a film position. In this embodiment, a rotary roller which presses film on a magnetic head can be also used as the position control roller.

When the rotary roller 41 does not advance in the direction of magnetic head 30, that is, a camera does not record, the position of the outer diameter of the contact portion 41b having thick diameters upward and downward, a portion actually touching and guiding the film 31, is adjusted so that the position corresponds with a line extended from a tunnel travelling path of the film 31 (see the roller position in FIG. 12).

A pin 55 for supporting a pressure plate 53 and a pressure spring 54 is calked and fixed on a back cover 56 of the camera. A moving control part 58d in the film width direction of the camera unit 58 and a pressure plate rail part (not illustrated) pressed on the pressure plate 53 are arranged on and under an aperture. When the back cover in closed, a film travelling path is formed in such a way that a definite space, that is, a tunnel interval is kept.

Driving signals and control signals are transmitted to a signal contact point from the camera unit for the magnetic head 30 fixed on the back cover 56 of the camera. Thus, camera condition or film information can be magnetically recorded and reproduced.

Figure 13:
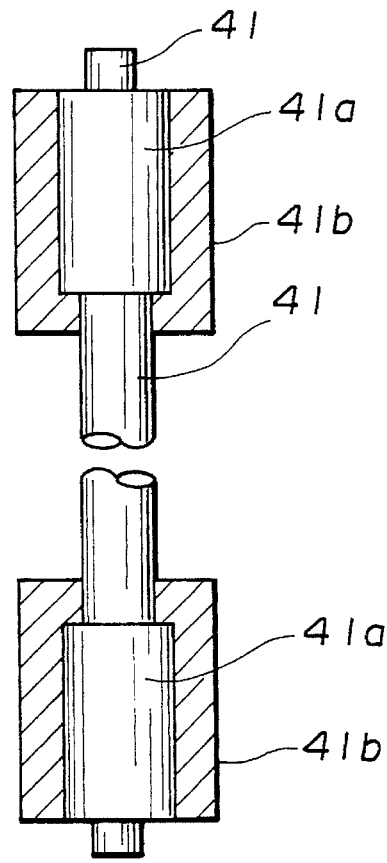
FIG. 13 is a sectional view of a rotary roller in FIG. 12.

Generally, metal or engineering plastic used for general structure parts, such as polycarbonate resin is used as material of the rotary roller 41. As shown in the sectional view of the roller in FIG. 13, metal material of stainless steel or the like as usual is used for the axis part 41a. To improve the reliability of the magnetic recording on the film 31, a roller 41 on which the contact portion 41b is covered with soft material, for example, rubber having rubber hardness 45°–70° may be used. This case is more effective because a larger area where the magnetic head 30 touches the roller across the film 31 can be held. After the roller contact portion 41b in FIG. 13 is molded by a method, such as two color molding, the outside is ground to be used. The roller 41 need not to be made by a two color molding method and may be molded with soft plastic. When the roller having such structure is supplied to the cameras in the first and second embodiments or the fourth embodiment to be described later, the roller is effective to be inexpensive and more reliable.

Figure 15:
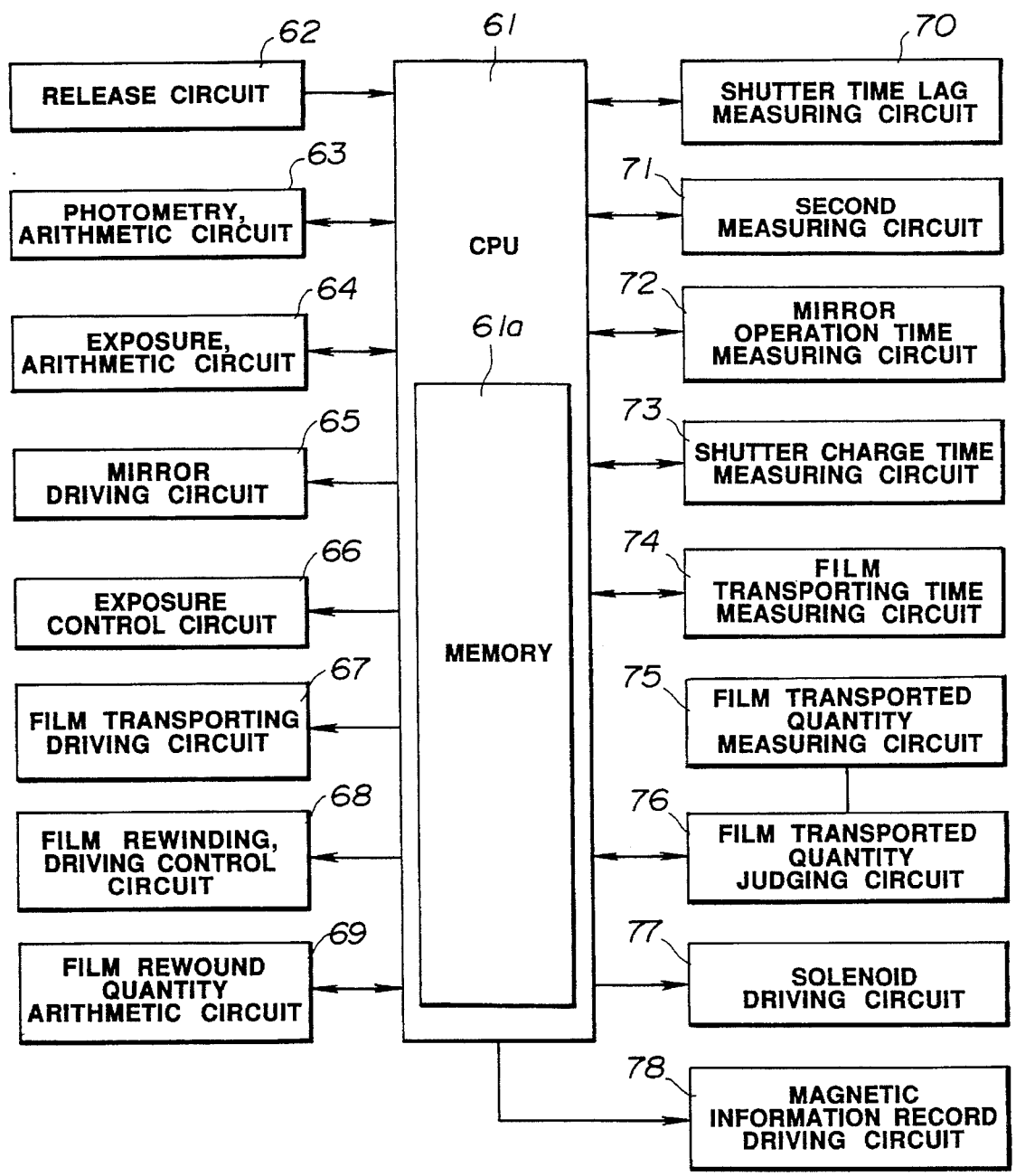
FIG. 15 is a block diagram showing a control portion in a camera in FIG. 8.

FIG. 15 is a block diagram of a control portion in the camera having the aforesaid magnetic recording mechanism in this embodiment.

Figure 14:
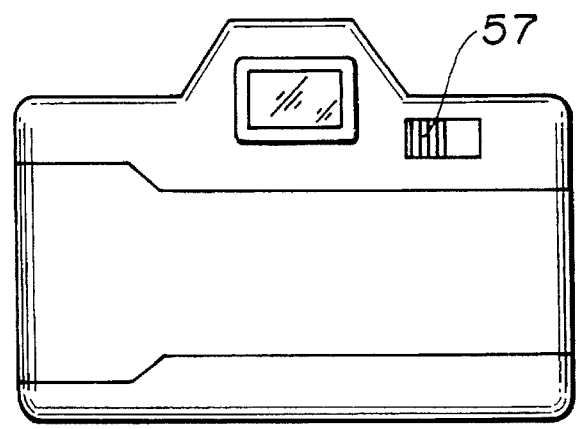
FIG. 14 is a rear elevation of a camera in which an initial data setting switch is arranged in a camera in FIG. 8.

As shown in FIG. 15, the control portion with a built-in memory 61a storing various data of photographic information, comprises a CPU 61 controlling the operation of all of the control elements, a release circuit 62, photometry and arithmetic circuit 63, an exposure and arithmetic circuit 64, a mirror driving circuit 65, an exposure control circuit 66, a film transporting and driving circuit 67, a film rewinding and driving circuit 68, a film rewound quantity arithmetic circuit 69, a shutter time lag measuring circuit 70, a second time measuring circuit 71, a mirror operations time measuring circuit 72, a shutter charge time measuring circuit 73, a film transporting time measuring circuit 74, a film transported quantity measuring circuit 75, a film transported quantity judging circuit 76, a solenoid driving circuit 77, and a magnetic information record driving circuit 78. FIG. 14 shows the back of a camera. An initial data setting switch 57 arranged on the back surface specifies an ID code of a photographer and a letter code previously registered.

Next, a photographic sequence of this embodiment having the magnetic recording mechanism of the aforesaid formation will be explained using the flowchart in FIG. 16A.

In this embodiment, a contact surface portion 41b of the rotary roller 41 is maintained in a position which approximately corresponds with a travelling surface of the film 31 as mentioned above, so that the travelling load of the film 31 is stabilized and the roller 41 rotates in accordance with the travelling of the film 31.

Figure 16A:
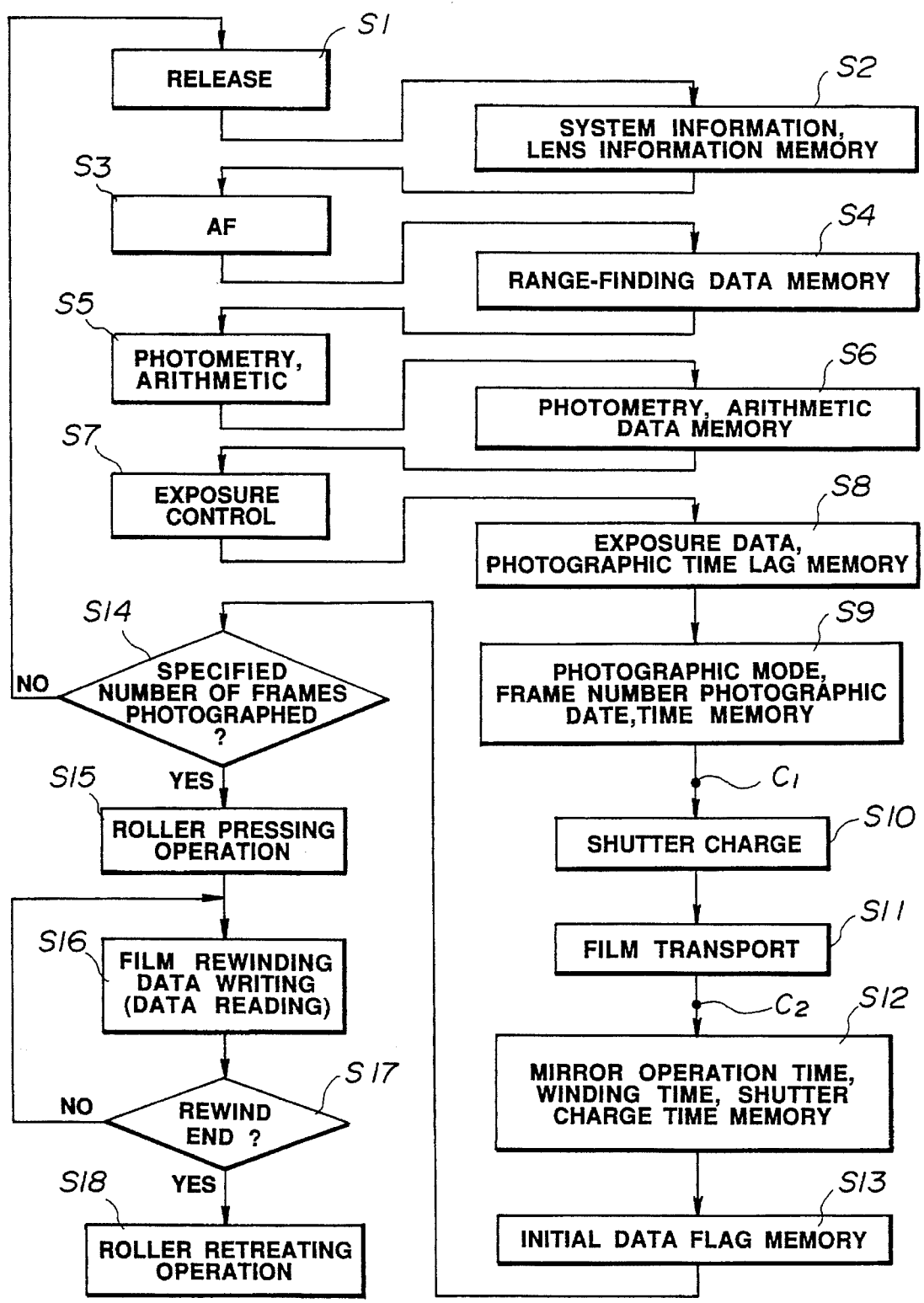
FIG. 16A is a flowchart of a photographic sequence of a camera in FIG. 8.

As shown in FIG. 16A, when a camera receives a release signal (step S1), photographic information including system information of a loaded lens, strobe and macro device and lens information is stored in a memory 61a in the camera (step S2). Successively, a range for AF (automatic focusing) is computed and lens is driven (step S3), and data based on the range computation is stored (step S4). Then, photometric computation is performed on the basis of the measured luminance information by light receiving elements in the camera (step S5). At this time, data based on the photometric computation result is stored (step S6).

Successively, exposure control, such as aperture control and shutter control is performed (step S7) and exposure data is stored (step S8). In the data, not only an aperture value and shutter speed are included but also time measuring result in a camera with an operation result of a shutter time lag is included. In addition, as a result of the exposure, a photographic mode, the number of photographic frames and photographic time are stored (step S9).

Then, operations for preparing the next photography, such as shutter charge and film transportation are conducted (step S10, 11). In the film transportation process, as shown in FIG. 8, pulse signals generated with the film transportation are detected by a photo-interrupter 8 and the film transported quantity is computed by a transported quantity measuring circuit 75 and is stored in a memory element. The pulse count value at the time of rewinding the film corresponds to a position of photographic frame.

When film transportation of one frame is completed, the process advances to a step S12, and mirror operation time, shutter operation time and rewinding time are stored in the memory.

Specifically, a shutter second time of the shutter operation time is stored as a result computed by a known method in which intervals applying electric currents in a first blind magnet and second blind magnet are measured by a timer circuit. Further, as a shutter time lag, a period from a release button is pressed to the first blind magnet is off is computed by the same method as mentioned above and a value to which a definite period from the magnet is off to the exposure of the picture plane end starts is added is stored.

Shutter charge, mirror operation and film transportation time are measured also by a known method by output of detecting means arranged in each corresponding unit, that is, an output signal of a transported quantity detecting means of the construction like the photo-interrupter 8 and slit plate 6 in FIG. 8 of the embodiment in which a pulse is generated in accordance with the operation quantity (not illustrated), and a timer circuit corresponding to each signal. The data based on the measured result is stored. The data is stored in the timing of the flow in FIG. 16A. Also, measuring computation of operation time can be carried out if a plurality of memory means are used.

Successively, in a step S13, a flag signal representing whether initial data is recorded or not is stored. The initial data is used to record an ID code of a photographer and a letter code previously registered. As explained in FIG. 14, a state of the switch 57 on the back of the camera is detected and set as the control flag. When film is magnetically recorded by the following method, it is judged whether initial data is recorded or not by the existence of the flag signal.

Then, the process advances to a judgement process of a step S14 and check a film photographic end signal output from a film transported quantity judging circuit 76 when the number of frames which have already been transported reaches a specified number of photographic frames. When the output of the photographic end signal is detected, the process advances to a step S15 mentioned later. In a case in which the photographic end signal is not output, the process returns to the step S1 and pictures are successively taken.

When the process advances to the step S15, a roller pressing process is conducted in the roller pressing process, a signal is generated from the CPU 61 to the solenoid driving circuit 77 and an electric current is applied to the solenoid 51. At the time of making the solenoid 51 contact, the movable iron core 49 is sucked against the spring 50. The second operation plate 48 is slid in the upper left direction and operated. At this moment, force is applied to the pulling spring 46 in the opening direction between a projection portion 42b of the first operation plate 42 and the second operation plate 48. The first operation plate 42 moves in the upper left direction in FIG. 9 by the applied force of the spring 46. The contact portion 41b of the rotary roller 41 moves toward the film from the retreated position in FIG. 12 so as to press the film 31 to the magnetic head 30. An aimed value is given to pressure force by setting the spring 46 to a certain applied force.

In this way, when the rotary roller 41 is advanced, the process continues to a step S16. Then, a control signal is supplied from the CPU 61 to the rewinding and driving control circuit 68, and a rewinding motor rotates inversely and the film 31 starts to be rewound.

When the film 31 starts to rewind, a pulse count value of the photo-interrupter 8 counted at rewinding is counted backward. Then, film rewound quantity and a position of each frame which has been already photographed are computed by the film rewound quantity arithmetic circuit 69. Since the positions of a photographic picture plane and the magnetic head 30 have been known, the positions can be controlled so that both positions coincide.

When a signal of a picture plane edge of each frame is transmitted to the CPU 61 by the film rewound quantity arithmetic circuit 69, memory data corresponding to each frame is read in and transmitted to the magnetic information recording and driving circuit 78. Based on the memory data, the magnetic information recording and driving circuit 78 drives the magnetic head 30 and magnetically records data on the film 31.

In this way, when the information of all the photographic frame is made to be corresponded with each photographic frame and magnetic recording is performed. When a step S17 detects the end of film rewinding, the process advances to a step S18 and the rotary roller is retreated and this routine is completed.

The rotary roller retreating operation in the step S18 will be explained in detail. First, a solenoid controlling signal is generated from the CPU 61. Then, an electric current is turned off in the solenoid driving circuit 77 and the suction force for the movable iron core 49 is lost. When the suction for the movable iron core 49 is released, the iron core 49 loses application force to the second operation plate 48. Next, by the application force of the springs 50 and 46, the projection portion 42b of the first operation plate 42 is pressed and slidably moved in the lower right direction in FIG. 9. The rotary roller 41 is retreated from a magnetic head 30, so that pressing force to the film 31 is released. At this moment, because the second operation plate 48 stops by touching the eccentric pin 47 for controlling a position, the position of the roller on the first operation plate 42 is controlled as well.

The eccentric pin 47 controls the position of the rotary roller 41 when electricity in the solenoid 51 is turned off. To feed film forward stably when the film is exposed, the position of the rotary roller 41 when the current is shut off is very important. In addition, when the magnetic head 30 is fixed on the side of the back cover 56, the solenoid 51 at the state of breaking contact is fixed in a position in which there is a little opening between the film 31 and the magnetic head 30 and no pressing force is generated.

In this way, the roller 41 never affects film travelling except for the time of magnetic recording and reproducing. As mentioned above, because the contact portion 41b of the roller 41 is positioned on a film travelling axis line, high stability of film travelling can be maintained. Further, when magnetic recording and reproducing is needed, the roller 41 advances to press the magnetic head 30 or the space between the magnetic head 30 and the film 31 is previously set to be small, so that the moving quantity of the roller 41 can likewise be small and the roller does not have a bad influence on film travelling during the time that data is magnetically recorded and reproduced.

The camera of the third embodiment is an example in which photographic information is written during a rewinding operation after a specified photographic frame is advanced. A modified photographic sequence of writing the photographic information in a modified example when a frame is advanced may be proposed.

Figure 16B:
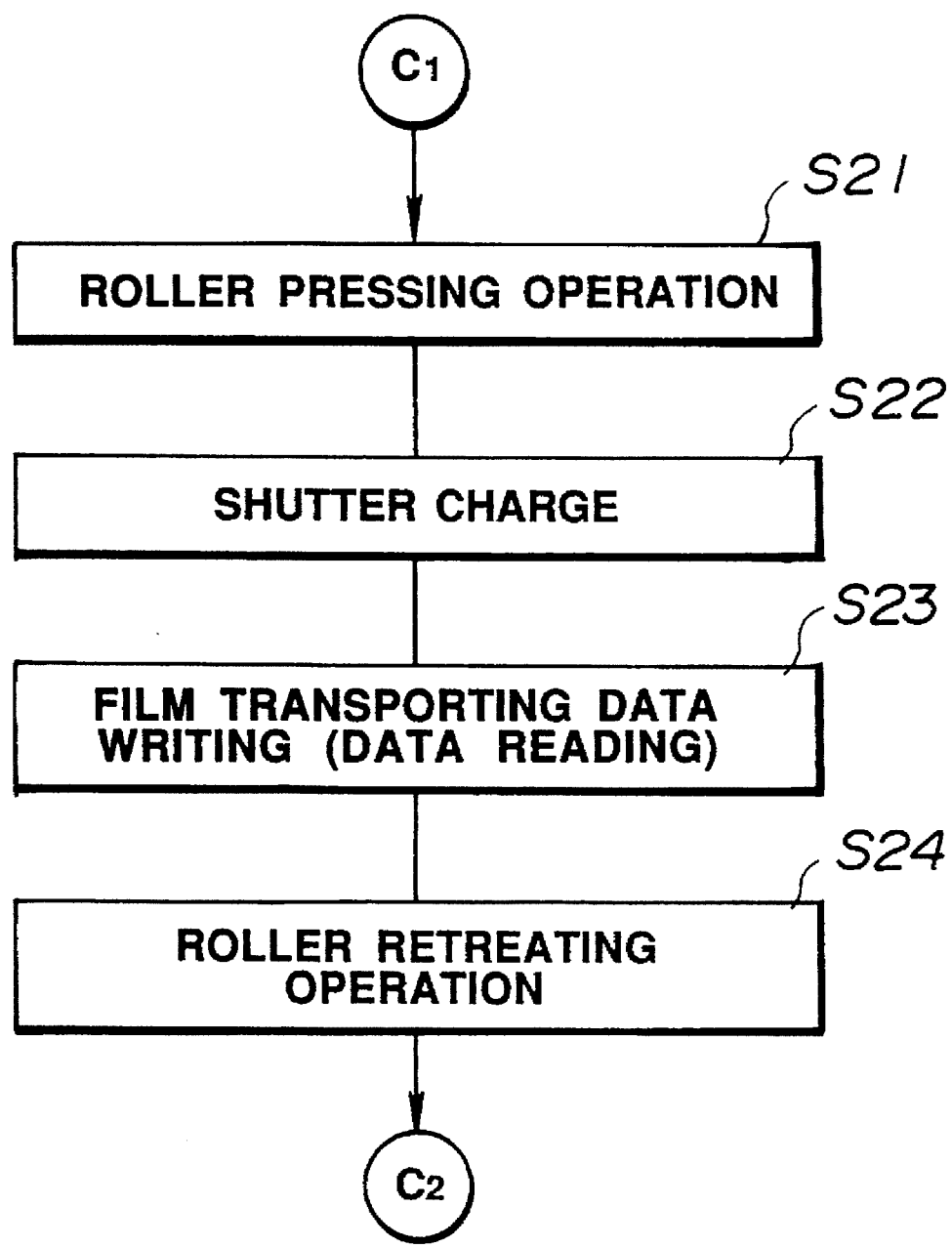
FIG. 16B is a flowchart of a modified example of a photographic sequence in FIG. 16A.

A flowchart of the photographic sequence in the aforesaid modified example is shown in FIG. 16B. The flowchart indicates a process inserted between process points C1 and C2 in the flowchart of the photographic sequence in FIG. 16A.

In the process or the modified example, the program advances to a step S21 in FIG. 16B after the process in the step S9 in FIG. 16A. In the step S21, the rotary roller 41 performs a pressing operation to press film to the magnetic head 30. This process is the same as that of the step S15 in FIG. 16A.

Then, a shutter is charged in a step S22. In a step S23, film of one frame is transported. At the same time, photographic information including a photographic mode, the number of photographic frames and photographing time is written on the film magnetic recording portion through the magnetic head 30. When the transportation and writing of the information are completed, the process advances to a step S24 and rotary roller retreating operation is conducted. The rotary roller retreating operation is the same process as that of the step S18 in FIG. 16A and makes the rotary roller 41 retreat to a retreated position. After that, the process returns to the step S12 through the process point C2 shown in FIG. 16A. The process thereafter follows the process in FIG. 16A. However, in the process of the modified example does not execute data writing in the steps S15, 16 and 18 in the following steps of the step S15 in FIG. 16A.

The data writing process through the magnetic head in the step S16 in FIG. 16A and the step S23 in FIG. 16B may be read through the magnetic head in these steps as the need arises.

In the above stated embodiments and modified example, a camera having a shutter near a picture plane like a focal-plane shutter of a single-lens reflex camera is proposed. A similar type of a camera can be also applied to a lens-shutter type camera. Then, it is considered to apply this invention to a lens-shutter type camera and a camera of the fourth embodiment will be explained.

Figure 17:
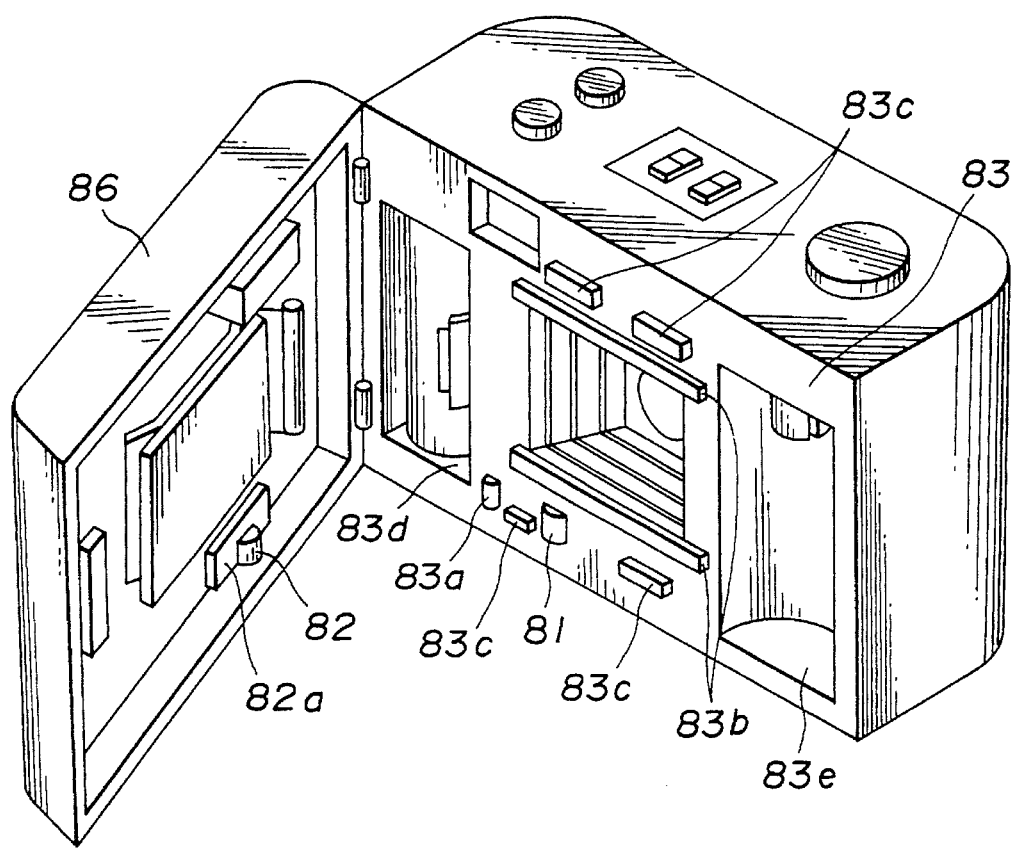
FIG. 17 is a perspective view of a state in which a back cover of a camera showing a fourth embodiment of the present invention is open.
Figure 18:
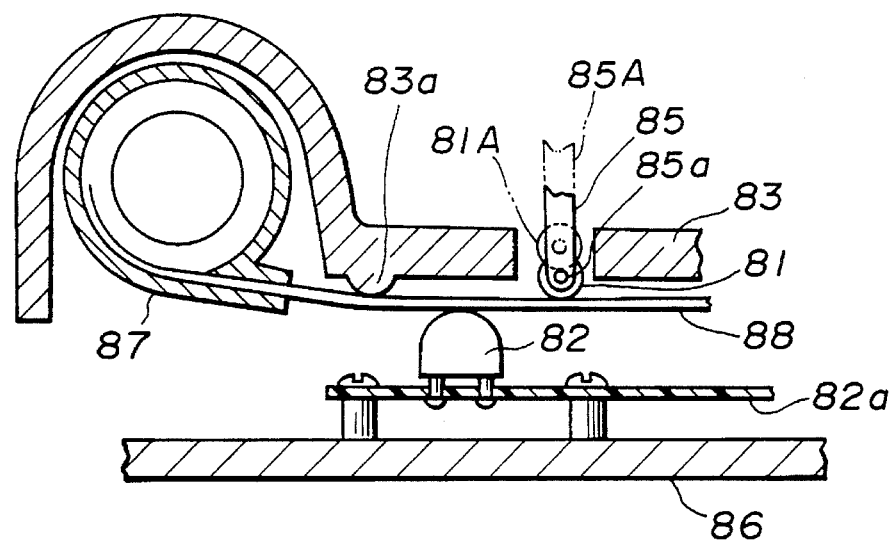
FIG. 18 is a transverse sectional view around a magnetic recording mechanism portion near a spool compartment of a camera in FIG. 17.

FIG. 17 is a perspective view in a state showing the fourth embodiment in which a back cover of a camera is open. FIG. 18 is a transverse sectional view of the region around a magnetic recording mechanism portion adjacent to a spool compartment. The camera in this embodiment combines a rotary roller for pressing film to a magnetic head with a lens shutter portion.

As shown in FIGS. 17 and 18, the magnetic recording mechanism portion of the camera comprises an operation plate 85 which can advance and retreat in the perpendicular direction to a film travelling surface, a rotary roller 81 rotatably supported by a bearing part 85a of the operation plate 85, a film guide projection 83a provided in a camera unit 83, and a magnetic lead 82 fixed on a back cover 86 through a magnetic head circuit base 82a. The film guide projection 83a is arranged on a film travelling portion outside a film rail 83b on the side of a winding compartment 83d of the camera unit 83. The projection 83a is projecting within the film travelling surface.

In the embodiment of FIG. 18, the magnetic head 82 enters into the region between the rotary roller 81 and the projection 83a when the back cover 86 is closed and is positioned almost corresponding to the position of the distal end of the projection 83a. The operation plate 85 and the rotary roller 81 move back to retreated positions 85A and 81A when magnetic recording is not performed. However, in a magnetic recording operation state, the operation plate 85 and the rotary roller 81 advance and move. Because the rotary roller 81 enters the film travelling surface, film 88 is stably held when the film is a plane state. Thus, the pressed state of the magnetic head 82 and the film 88 are stabilized.

In a case of a lens-shutter camera, the camera has merit of enabling to use a space on a lens side around a picture plane freely in comparison with a camera of a focal-plane shutter. Therefore, the rotary roller 81 and the magnetic head 82 in this embodiment can be effectively arranged in the most suitable position for magnetic recording.

In the cameras of the first, second, third and fourth embodiments, a rotary roller is provided to face a magnetic head across film and advanced and retreated to press the film.

(1) Film travelling resistance can be remarkably reduced. Electric consumption can be suppressed and the life of a battery can be extended. Further, it is not necessary to increase reduction ratio of winding diameter, and winding speed can be high.

(2) Because a roller is retreated at photographing, a magnetic head is not pressed against film and there is no effect on a film plane at photographing. Also, there is no mechanical problem in which magnetic recording and reproducing is not performed well, due to film base transformation which is produced by pressing film all the time.

(3) Although a former magnetic recording mechanism made a magnetic head retreat, a magnetic head in this invention is fixed in a specified place and a roller is advanced and retreated, so that electric reliability for cutting a wire or the like can be increased and a head angle to a film travelling direction can be adjusted easier by fixing the head in a specified place.

Figure 19:
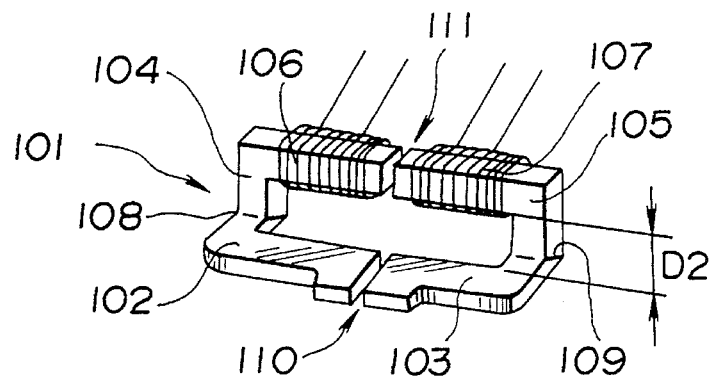
FIG. 19 is a perspective view showing a core and a coil in a magnetic head showing a fifth embodiment of the present invention.
Figure 20:
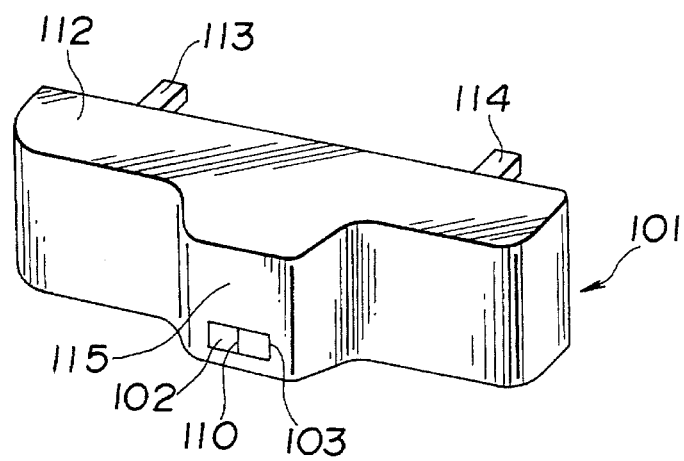
FIG. 20 is a perspective view of a magnetic head in FIG. 19.
Figure 21:
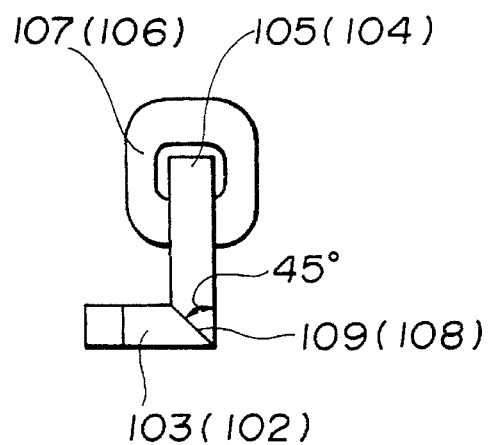
FIG. 21 is a side view of a magnetic head in FIG. 19.

FIGS. 19, 20, and 21 shows a camera magnetic recording and reproducing head in the fifth embodiment of the present invention. As the same as that of the former core, cores of a magnetic head 101 are composed of substantially planar front cores 102 and 103 facing to each other arranged so as to form an air gap portion 110, and back cores 104 and 105 on which operation coils 106 and 107 are wound. The back cores 104 and 105 are arranged perpendicularly to rear ends of the front cores 102 and 103 arranged horizontally. Then, the cores are formed into an unit by fitting the front cores 102 and 103 and the back cores 104 and 105 with bonding surfaces 108 and 109. Accordingly, the side of the front cores; 102 and 103 and the back cores 104 and 105 is formed into an L-shape viewed from a travelling direction of a recording medium. Also, an air gap portion 111 is formed between the back cores 104 and 105. The distance between the facing parts of the front cores 102 and 103 and the back cores 104 and 105 is D2.

FIG. 20 shows an outward appearance of a magnetic head 101 stored in a shield case 112. In the magnetic head 101, the cores are assembled. Exterior connecting terminals 113 and 114 of the operation coil is projecting from the back of the magnetic head. The air gap portion 110 is exposed under a head surface 115 consisting of arc projection parts formed at the forward center of the magnetic head 101. The head surface 115 touches a magnetic recording medium on film and magnetic recording is performed by the air gap portion 110.

FIG. 21 shows a bonding of parts of the front core 103(102) and the back core 105(104) wound by the operation coil 7. The front core 103 (102) and the back core 105 (104) are arranged to form a vertical (reversed) L-shape. Each of the rear end surface of the front core 103(102) horizontally arranged and the lower end surface of the back core 105 (104) perpendicularly arranged to the rear end surface become the bonding surface 109 (108) which is ground to be 45°, respectively. The bonding surface is lapped until it becomes a mirror finish to reduce magnetic resistance of the bonding part as small as possible. Additionally, it is considered that each of facing areas of the bonding surfaces 108 and 109 is made to be larger than the cross sectional area of each core, and magnetic resistance is reduced so as to transmit more magnetic flux. As a matter of course, even if a lapping surface is made to be 90° and bonded with each other, the surface has no different effect to make the surface a flat shape from that to be 45°. However, the effect in which larger facing area is more magnetically effective and magnetic resistance is reduced is explained in this embodiment. Since each of the back cores 104 and 105 is shaped into an L-shape viewed from the front, a distance D2 between the front cores 102 and 103 depends on the aforesaid L-shape and leak magnetic flux can be reduced to a level in which the leakage does not cause a problem.

The object of the present invention is to form a flat-type magnetic head. If a shape of a core is made to be longer in the lengthwise direction, the thickness of winding coil is thinned and the same number of turns can be obtained with the same magnetomotive force of the coil can be produced. Thus, a thinner magnetic head can be made.

Figure 22:
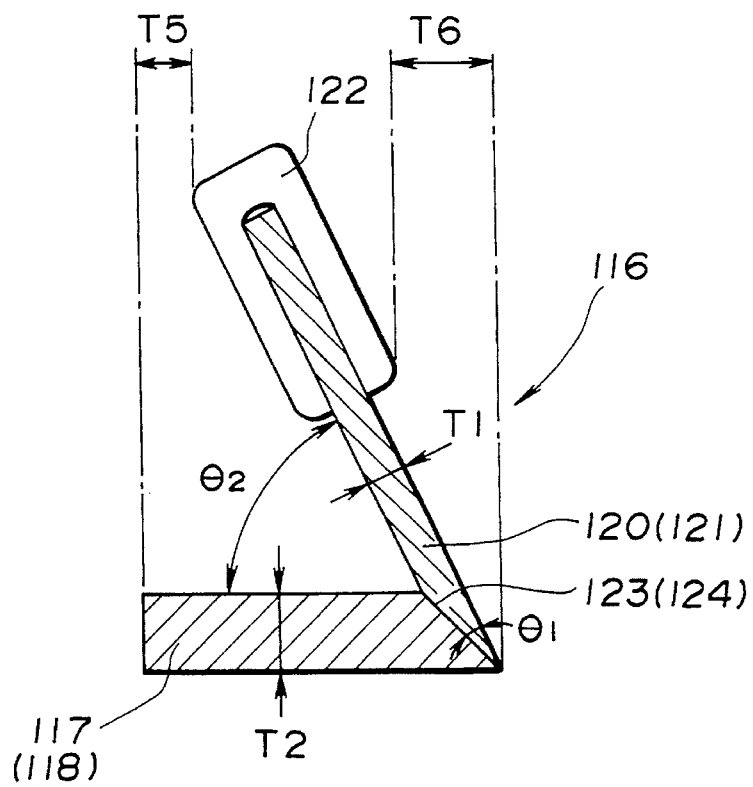
FIG. 22 is a main part enlarged sectional view of a core and a coil in a magnetic head showing a sixth embodiment of the present invention.
Figure 23:
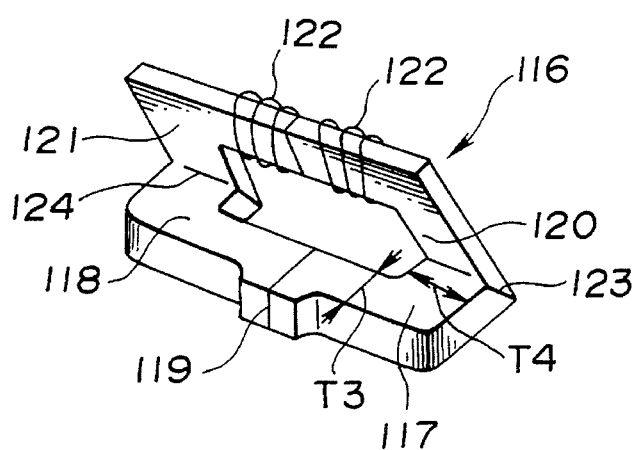
FIG. 23 is a perspective view of a core and a coil in a magnetic head in FIG. 22.

FIGS. 22 and 23 show the sixth embodiment of the present invention. In this embodiment, a shield case is removed and only a core and an operation coil are indicated. Specifically, FIG. 22 shows a main part section of a core and coil forming a magnetic head 116. FIG. 23 is a perspective view of the core and coil. Between fitting surfaces of the front cores 117 and 118, a magnetic recording air gap portion 119 for touching a magnetic recording medium on film (not illustrated) is formed. Each shape of back cores 120 and 121 viewed from the front is an L-shape. An operation coil 122 is wound on a part of each of the cores 120 and 121. Bonding surfaces formed of the rear end surfaces of the front cores 117 and 118 and bonding surfaces formed of the lower end surfaces of the back cores 120 and 121 are ground so that an air gap is decreased. The thickness of the front cores 117 and 118 is made to be T2 corresponding to a necessary recording track width. The thickness of the back cores 120 and 121 is made to be T1 which differs from (and is thinner than) T2.

The front of the back cores 120 and 121 is approximate an L-shape. A bonding ground surfaces of the back cores 120 and 121 is ground at an angle forming the same area as the area of the bonding surface of the front cores 117 and 118. The front cores 117 and 118 are formed so that the width of a part T4 bending as an L-shape having the bonding surface of the back cores 120 and 121 is wider than the width of a part T3 facing a coil 122. Because it is necessary that the back cores 120 and 121 keep cross sections required for passing sufficient flux, the thickness of the back cores is thinner than that of the front cores 117 and 118, and size of the width is enlarged to make the bonding surface larger. The front cores 117 and 118 and the back cores 120 and 121 formed in this way are connected at an acute angle $\phi 2$, then, a magnetic circuit is produced.

Further, as shown in FIG. 22, the front end part of the coil 122 has a size so that it is set back from the left-hand end of air gap 119 by a distance T5 so as not to project from the air gap portion 119 of the front cores 117 and 118. The rear end part of the coil has a size so that it is set in from the back edge of the back cores by a distance T6 so as not to project from the rear end part of core bonding surfaces 123 and 124. To make such arrangement, a bonding angle θ 2 and ground surface angle θ 1 are determined.

If the magnetic head 116 is formed as mentioned above, the width of the coil does not influence the width of the head and the magnetic head can be a flat shape (thin shape) while a winding space of a coil is formed sufficiently large.

Figure 24:
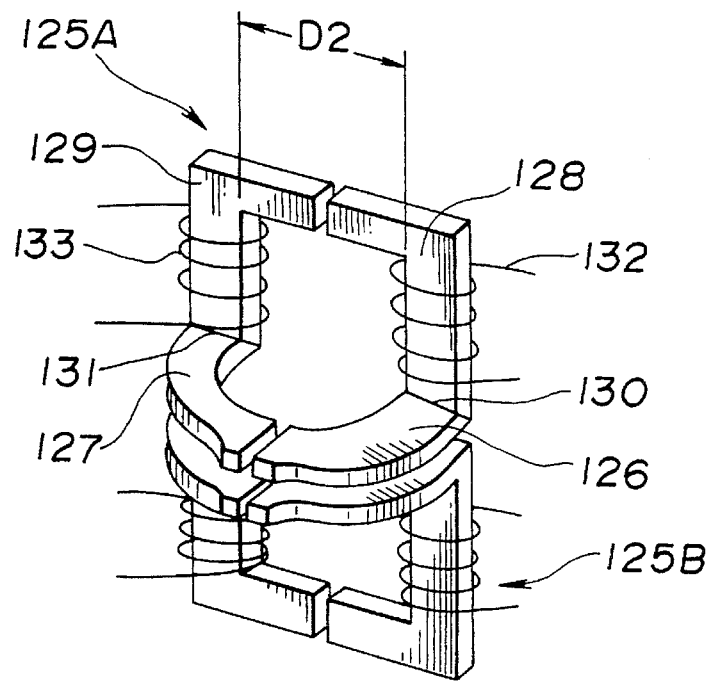
FIG. 24 is a perspective view of a core and a coil in the magnetic head showing a seventh embodiment of the present invention.
Figure 25:
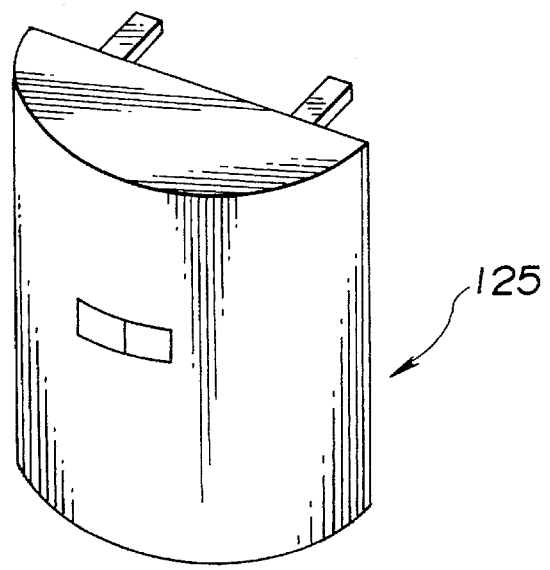
FIG. 25 is a perspective view of a magnetic head in FIG. 24.

FIGS. 24 and 25 show a magnetic recording and reproducing head of the seventh embodiment in this invention in which magnetic recording and reproducing can be performed. FIG. 24 shows structure of a core and an operation coil. FIG. 25 shows an outer appearance of a magnetic head 125 in which the core and operation coil in FIG. 24 are stored in a case. The upper part of the head in FIG. 24 forms a magnetic recording head 125A. Similar to the fifth embodiment, a side shape of front cores 126 and 127 and back cores 128 and 129 are formed into an approximate L-shape. L-shaped bending parts 130 and 131 are ground to be a bonding surface arranged at 45° with each other. Operation coils 132 and 133 are wound on parts of the back core extended in the vertical direction. The magnetic reproducing head 125B arranged in the lower part is formed as the same structure as that of the upper part. Only the width of a reproducing air gap portion made of front cores is different from that of the upper part. A bonding part of the reproducing head with a magnetic medium is produced by a known method.

In such structure, the shape of the magnetic head is stretched in the lengthwise direction; however, it can be a flat-shape without enlarging in the thickness direction. Therefore, the magnetic head is a very convenient shape for loading in a back cover of a camera.

In the fifth, sixth and seventh embodiments, a core is divided into a front core and a back core. While these cores bond together to be an L-shape, these cores are opposed as a pair of cores to form an air gap. In addition, a mono-piece type in which a front core and a back core are formed as an unit and the side shape of the unit is an approximate L-shape can also obtain the same effect.

Figure 26:
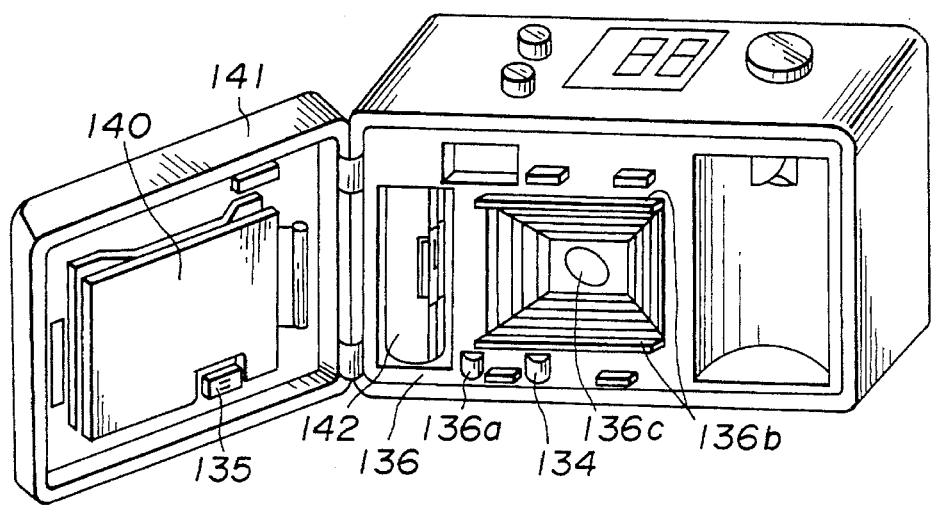
FIG. 26 is a perspective view showing a state in which a back cover of a camera incorporates a magnetic recording and reproducing head of either the fifth, sixth or seventh embodiment.
Figure 27:
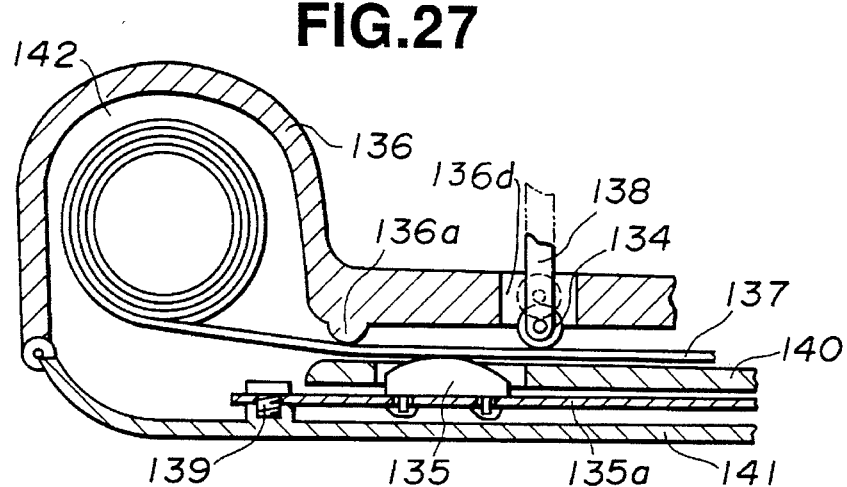
FIG. 27 is a main part enlarged sectional view showing a magnetic recording and reproducing head portion of the camera in FIG. 26.
Figure 28:
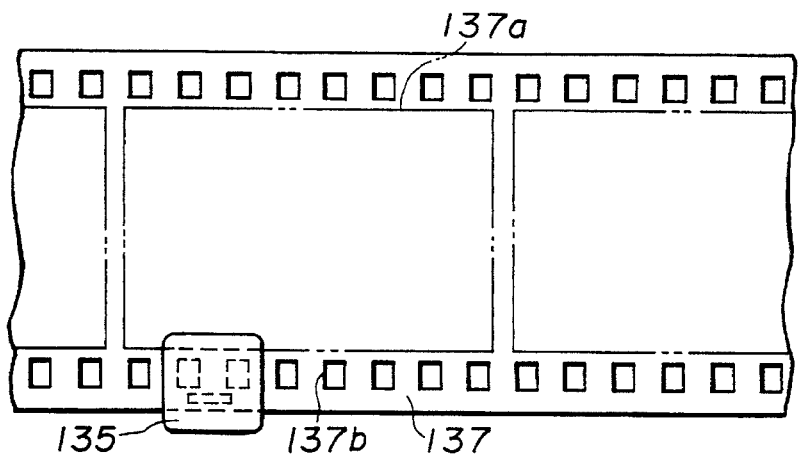
FIG. 28 is a front view showing a contact state of a magnetic recording and reproducing head on a magnetic recording medium of a camera in FIG. 26.

FIGS. 26, 27 and 28 show an example in which a magnetic head having the flat-type structure shown in the fifth, sixth and seventh embodiments is combined with a lens-shutter camera using photographic film containing a magnetic information recording medium.

A magnetic head 135 is a thin and flat type head and arranged on a back cover 141 of a camera. That is, a circuit base 135a mounting the magnetic head 135 is disposed between a film pressure plate 140 provided on the side of a back cover 141 and the back cover 141, and fixed on the back cover 141 by a screw 139. The head surface of the magnetic head 135 is exposed by cutting a part of the lower portion of the film pressure plate 140. When the back cover 141 is closed, the head is arranged so as to face the outside of perforations at the lower portions of film 137 which is spread over an aperture 136d on the side of a camera unit 136 as shown in FIG. 27.

At the same time, a film pressing roller 134 held by a supporting arm 138 is arranged to be able to go in and out in a position near a film supplying compartment 142 at the lower portion of the aperture 136d having a film rail 136b at the upper and lower ends. The roller 134 is used to press the film 137 against the magnetic head 135. For example, the roller 134 moves toward the side of back cover 141 before film transportation related to an exposure end signal starts and pushes the film 137 to be pressed on the magnetic head 135. Further, a film guiding projection 136a having a semicircular distal end is formed in the camera unit 136 as a unitary body in a position near the film supplying compartment 142.

A height of the projection 136a is almost the same as that of the film rail 136b. The projection 136a is arranged in a symmetrical position of the roller 134 with respect to the magnetic head 135. When the roller 134 moves to press the film, the projection 136a in cooperation with the roller 134 supports the film by two point to press the film 137 again the magnetic head 135.

In the magnetic head 135 arranged in this way, a film pressing roller 134 moves to an operation position indicated by a solid line from a retreated position indicated by a dotted line as shown in FIG. 27 by a pulse signal generated at the time of starting the film transportation of frames which finish photographing. Then, while the film 137 is pushed toward the head 135, magnetic recording data is written by synchronizing with the pulse signal, or a magnetic signal which has previously written on the film is read, and then, the data of photographic frame is stored.

When specified data is written or read and the number of counted pulses generated in accordance with the film transportation quantity reaches a predetermined value, the film pressing roller 134 moves to a retreated position shown by a dotted line as shown in FIG. 27 and releases the pressure on film. Thus, the roller waits for the next photographing operation.

When the magnetic head 135 is arranged in this way, the head 135 is disposed between the film pressing roller 134 and the projection 136a. Therefore, too much load is prevented from being applied to film or a magnetic head at transporting film, and film planeness at the time of film transportation is raised, so that film winding on a winding spool can be stabilized. Furthermore, if the projection 136a is replaced with a roller, load at the time of film transportation can be reduced.

As mentioned above, the use of the flat-shaped magnetic head shown in the fifth, sixth, and seventh embodiments makes it easy to obtain a space for loading the magnetic head in the back cover as shown in FIG. 26 and a magnetic recording and reproducing apparatus can be loaded without increasing the thickness of a camera. A side of cores in the magnetic recording and reproducing head is formed into an L-shape by bonding a front core and a back core, so that a magnetic head can be effectively arranged even in a small camera without lowering magnetic performance.

Figure 29:
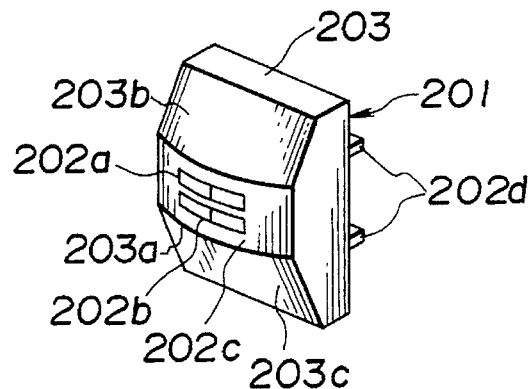
FIG. 29 is a perspective view of a magnetic recording and reproducing head for a camera showing an eighth embodiment of the present invention.
Figure 30:
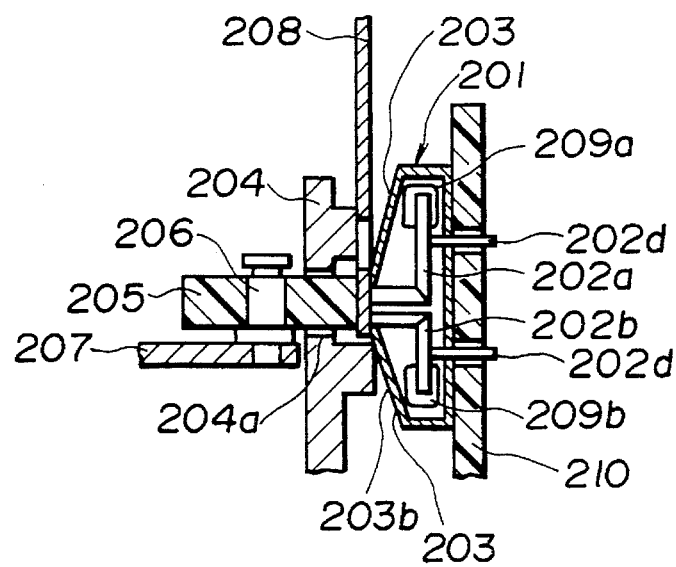
FIG. 30 is a main part sectional view showing a state in which a magnetic head in FIG. 29 is used.

FIGS. 29 and 30 show a camera magnetic head of the eighth embodiment of the present invention.

The magnetic head in the fifth, sixth, and seventh embodiments is a flat-type and very convenient for loading in a camera. In comparison with a former magnetic head, necessary volume of the magnetic head is the same but the shape of the head is thinner. Accordingly, a head surface for magnetically recording data spreads over like a plane. Thus, as shown in FIG. 28, a pressing surface of the head to film 137 sometime catches a part of perforations 137b or a photographic plane 137a.

If the pressing surface catches a photographic plane, there is a problem of damaging film when dust or sand enters between the film and the head. Also, because a part of the perforations is punched by a pressing manufacturing in a film manufacturing process, complete planeness around the perforations is not maintained. Therefore, unevenness around the perforations or edges intermittently bumps against the magnetic head in accordance with film transportation, and the head is badly worn. Thus, it is a problem on durability of the head.

Further, the pressing force between the film and the magnetic head changes with intermittent contact of unevenness or hole edges. Then, it causes a problem in that a magnetic recording and reproducing signal is not stabilized. In order to prevent this problem, pressing force increases and load at feeding film increases. As a result, a problem, such as a decline in the performance of a camera or quickly consuming a battery, is generated.

The magnetic recording and reproducing head for a camera in the eighth embodiment solves the aforesaid problem. In other words, in a magnetic recording and reproducing head 201 for a camera in the eighth embodiment, a gap portion 202c for recording and reproducing data is formed at the front part and cores 202a and 202b made of permalloy or the like on which a coil 209a into which a recording signal current is sent and a coil 209b into which a reproducing signal current is sent are wound at the rear part are stored in a cover case 203 produced by a known method, such as a press manufacturing as shown in FIGS. 29 and 30.

In the cores 202a and 202b, a forming part of the gap portion 202c is exposed at the front center of the cover case 203 and fixed in the cover case 203 by glue filled up in the cover case 203. The exposed gap portion 202c and a band portion 203a in the horizontal direction at the middle of the front of the case including the gap portion 202c are ground to be the same plane.

The front of the case of the band portion 203a formed on the ground surface is formed into an arc against the film travelling direction. The curved front of the case prevents film being caught during film travelling or prevents film travelling resistance from increasing due to a large bonding surface.

At the front of the magnetic head 201, an upper part and lower part of the band portion 203a are formed to be slopes 203b and 203c separating from a photographic film surface, respectively. Specifically, the band portion 203a is composed of parts corresponding to a forming part of the gap portion 202c of cores 202a and 202b stored in a case 203 and case surfaces of the upper and lower parts of the band portion 203a are formed into slopes 203b and 203c retreated from the band portion 203a.

At the back of the magnetic head 201, a connecting terminals 202d and 202d connected to the coils 209a and 209b in the case 203 are projecting. The connecting terminals 202d and 202d are fixed to the case 203 by filling up sealing material in the case 203.

FIG. 30 shows a state in which the magnetic head 201 of the eighth embodiment is fitted to the back cover of a camera and touches a magnetic information recording portion of film 208. That is, the magnetic head 201 is mounted on a circuit base 210, and its connecting terminals 202d and 202d are inserted into the base and soldered in a printed circuit. Therefore, the magnetic head 201 is fitted on the base 210 fixed on the back cover. When the back cover is closed, the gap portion 202c of the magnetic head 201 is arranged in a position touches the magnetic information recording portion magnetically coated at the back of the film 208 spread on the side of a camera unit 204.

On the side of the camera unit 204, an aperture 204a is bored at the position of the gap portion 202c of the magnetic head 201 facing film. A film pressing roller 205 is projecting so as to be able to go in and out from the aperture 204a towards a film surface facing the magnetic information recording portion of the film 208 which is spread. That is, the pressing roller 205 is rotatably fitted to a supporting axis 206 fixed at a distal end portion of a lever 207 which is driven by a pressing and driving mechanism (not illustrated) arranged in the camera unit 204. When magnetic recording or reproducing is conducted in the magnetic information recording portion by the magnetic head 201, a part of the peripheral surface of the pressing roller 205 is projecting from the aperture 204a to press film surface.

In the magnetic head 201, in a state in which the back cover is closed and the gap portion 202c touches the magnetic information recording portion of the film 208 which is spread, the slopes 203b and 203c under upper and lower parts of the gap portion 202c on the front of the cover case are separated from the film 208 as shown in FIG. 30. Then, the surface of the cover case of the magnetic head except for a surface touching the magnetic information recording portion on the surface facing film is separated from a photographic film surface. Thus, the front-most part of the cover case of the magnetic head does not touch a photographic picture plane and perforations.

Accordingly, when the film 208 is transported and magnetic recording or reproducing is performed by the magnetic head 201 touching to the recording portion of the film, the front of the cover case does not touch a photographic picture plane, and dust or sand which is inserted does not damage a photographic picture plane. Further, inconvenience in which edges of perforations damage durability of a magnetic head or make film emulation come off so that the inside of a camera becomes dirty, and as a result, a camera is not smoothly operated, can be prevented.

Figure 31:
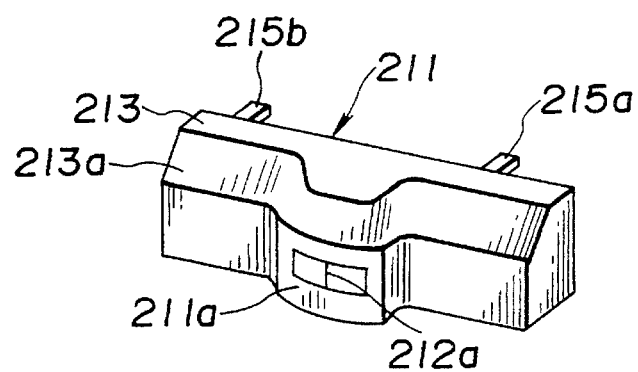
FIG. 31 is a perspective view of a magnetic recording and reproducing head showing a ninth embodiment of the present invention.
Figure 32:
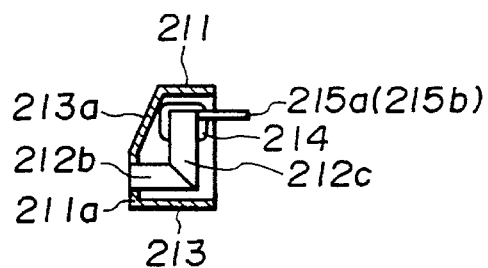
FIG. 32 is a main part vertical section of a magnetic head in FIG. 31.

FIGS. 31 and 32 show a magnetic head of the ninth embodiment of the present invention. A magnetic head 211 of the ninth embodiment is formed to be a rectangular shape along the film travelling direction. A touching portion head 211a which is projecting forward is formed at the center of the magnetic head portion 211a. On the middle of the touching head portion 211a, a gap portion 212a formed of cores 212b and 212c stored in a cover case 213 is exposed.

At the edge of the upper surface of the cover case 213 of the rectangular magnetic head 211, a slope 213a separating from a photographic film surface is formed. The magnetic head 211 is, for example, formed as a magnetic head for recording. In the cover case 213, a front core 212b forming the gap portion 212a and a back core 212c wound by a coil 214 are fixed to the case 213 by filling up sealing material as shown in FIG. 32. At the back of the magnetic head 211, connecting terminals 215a and 215b connected to the coil 214 in the case are projecting. The connecting terminals 215a and 215b are fixed to the case 213 by filling up sealing material.

The magnetic head 211 of the ninth embodiment is operated in the same manner as that of the magnetic head 201 of the eighth embodiment.

Figure 33:
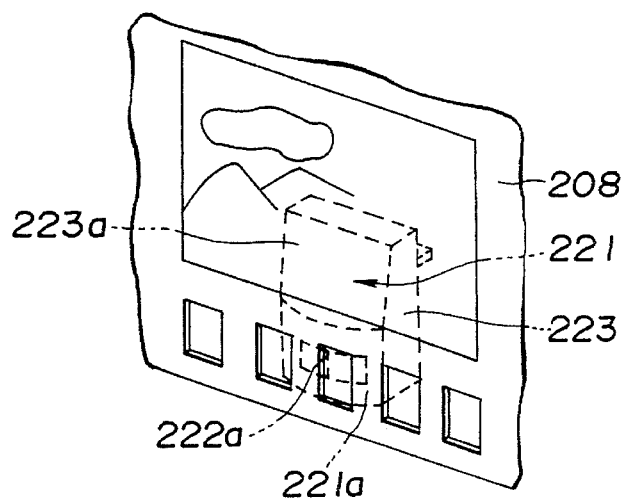
FIG. 33 is a perspective view of a magnetic recording and reproducing head for a camera showing a 10th embodiment of the present invention.

FIG. 33 shows the 10th embodiment of the present invention. A magnetic head 221 of the 10th embodiment is applied to a camera in which a magnetic information recording portion provided at the reverse surface of film 208 is supplied between perforations. In other words, a touching head portion 221a which is a lower part of the magnetic lead 221 is projecting like an arc. At the middle of the magnetic head portion 221a, a gap portion 222a formed of cores stored in a cover case 223 is exposed. Then, the gap portion 222a is pressed against the magnetic information recording portion.

Then, an upper front part of the head 221 is stopped at 223a separating from a photographic film surface. The magnetic head 221 of the 10th embodiment is operated in the same manner as that of the magnetic head 201 of the eighth embodiment.

Figure 34:
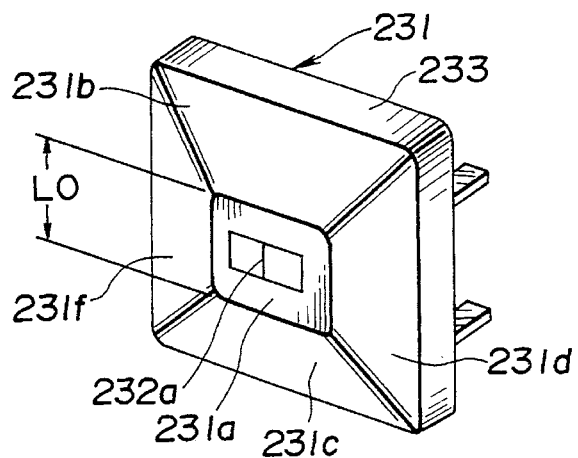
FIG. 34 is a perspective view of a magnetic recording and reproducing head for a camera showing an eleventh embodiment of the present invention.
Figure 35:
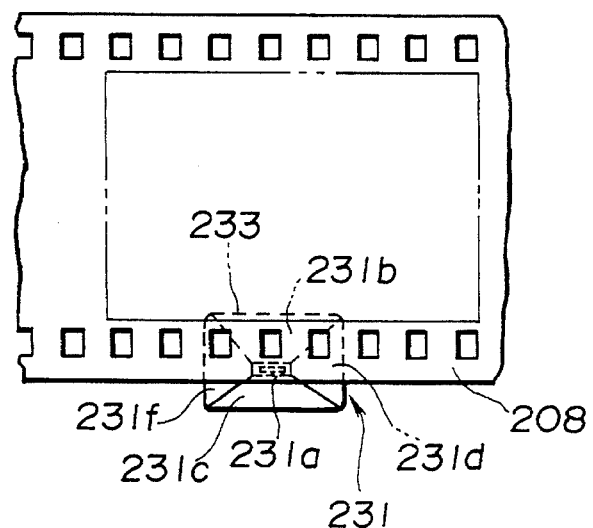
FIG. 35 is a front view showing a state in which a magnetic head in FIG. 34 is used.

FIGS. 34 and 35 show the 11th embodiment of the present invention. A magnetic head 231 of the 11th embodiment is made of a thin head of which a surface facing the film 208 is a rectangular shaped. At the center of a cover case 233, a touching head of a rectangular shape composed of a group of small planes is formed. At the center of the magnetic head portion 231a, a gap portion 232a formed of cores which are stored in the cover case 233 is exposed. The gap portion 232a presses against a magnetic information recording portion of the film 208. The magnetic information recording portion is provided at an edge outside the perforations of the film 208.

The upper and lower, and right and left of the front of the case of the touching lead portion 231a is formed of slopes 231b–231f each of which inclines toward a peripheral edge part of the case 233.

FIG. 35 shows a state in which a magnetic head 231 touches the magnetic information recording portion of film 208. When the touching head portion 231a is pressed to the magnetic information recording portion, the slope 231b of the magnetic head 231 is separated from a film picture plane and perforations so as not to touch them. The slope 231c is separated from a projection of a pressure plate rail so as not to touch it. The slopes 231d and 231f escape in the travelling direction of the the film 208 to reduce travelling resistance and make film and magnetic lead 231 contact stably. A size L0 (see FIG. 34) in the width direction of the touching head portion 231a is determined depending on a track width for magnetically recording or reproducing and processed by a drawing process or the like so as to make the size larger than the thickness of the core.

Figure 36:
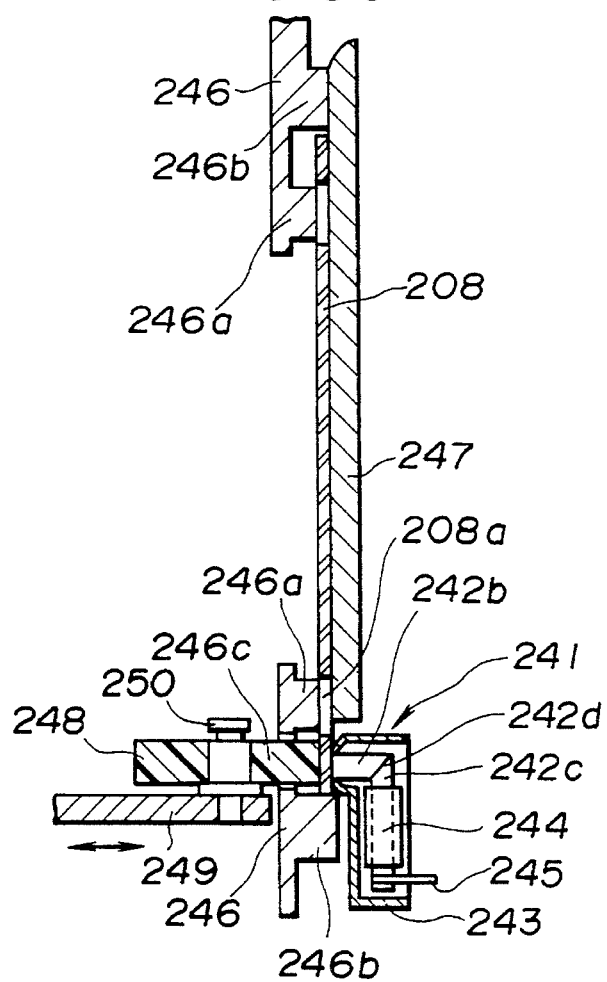
FIG. 36 is a main part sectional view showing a state in which a magnetic head in a twelfth embodiment of the present invention is used.
Figure 37:
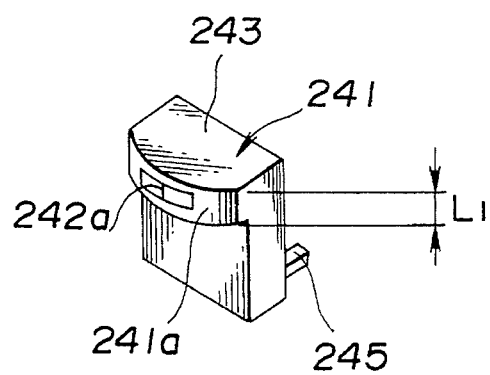
FIG. 37 is a perspective view of a magnetic head in FIG. 36.
Figure 38A:
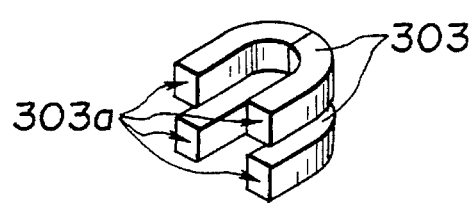
FIGS. 38(*a*) through 38(*d*) are perspective views showing an assembling order of a former magnetic head.
Figure 38B:
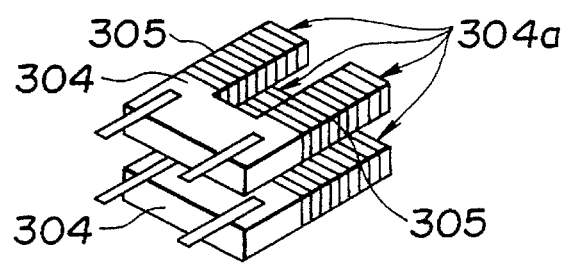
Figure 38C:
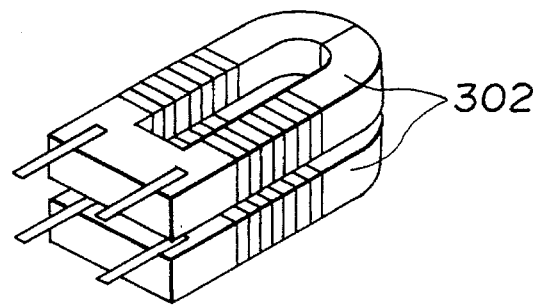
Figure 38D:
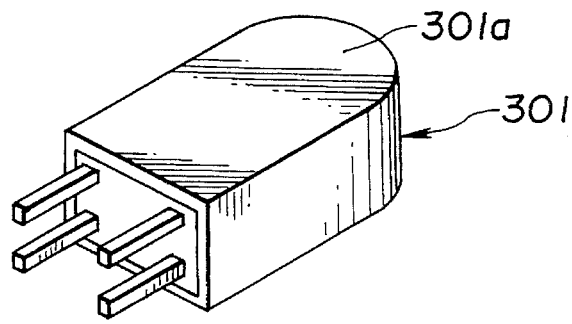
Figure 39:
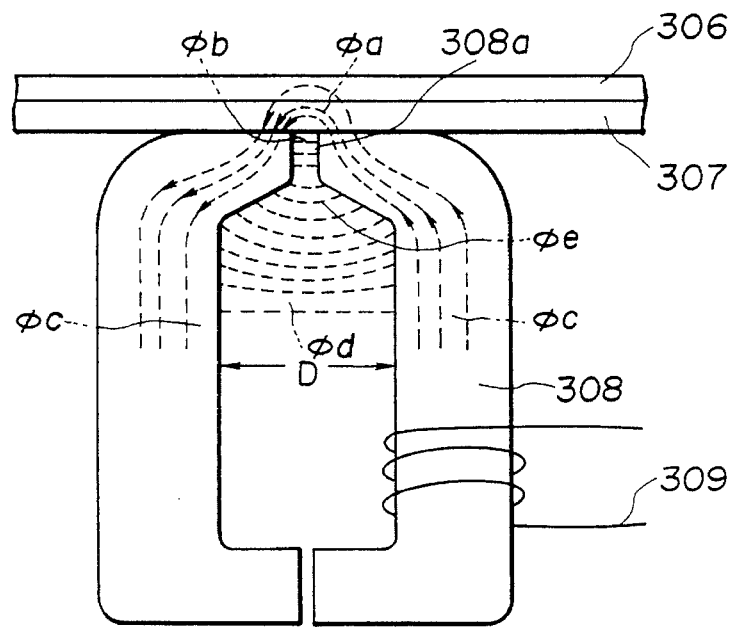
FIG. 39 is a diagram showing a flux flow in a core of a magnetic head of a former shape.
Figure 40:
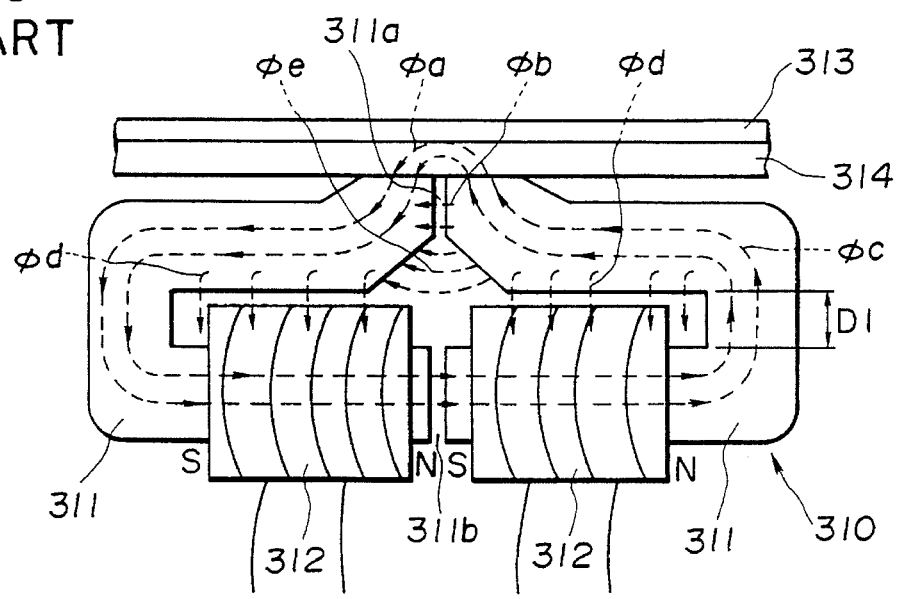
FIG. 40 is a diagram showing a flux flow in a core when a former magnetic head is formed into a flat-shape.
Figure 41:
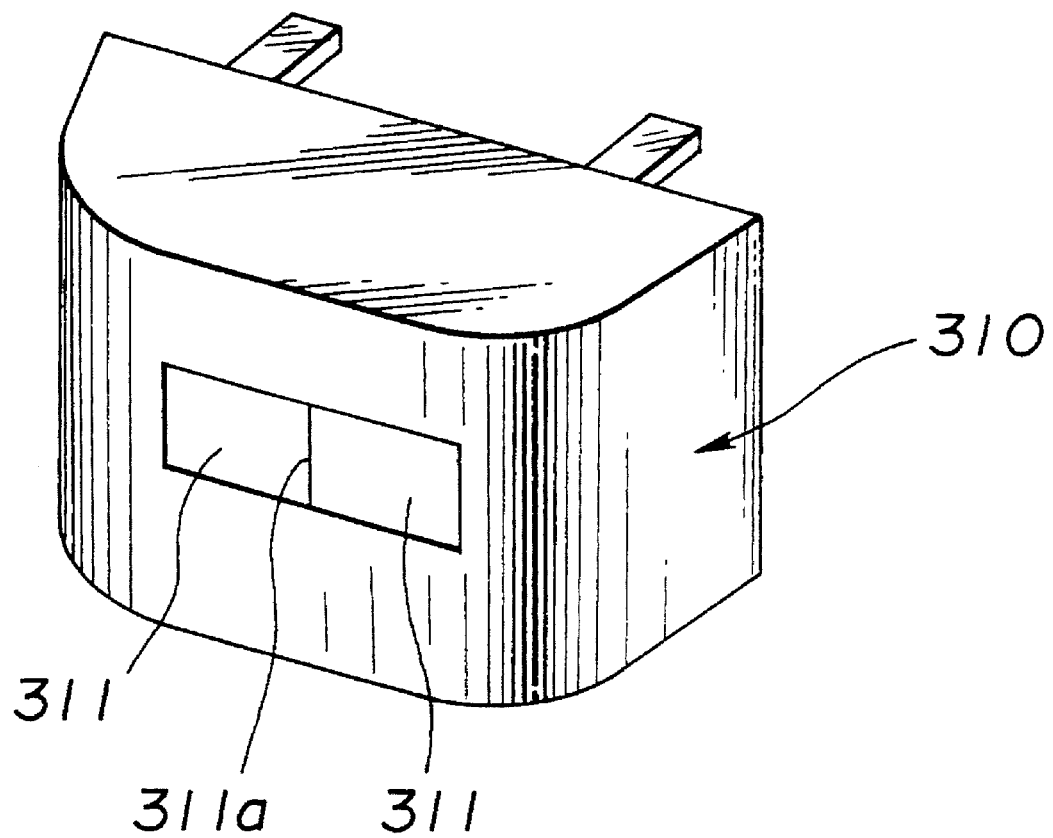
FIG. 41 is a perspective view of a flat-shaped magnetic head having the construction shown in FIG. 40.

FIGS. 36 and 37 show the 12th embodiment of the present invention. The side face and a longitudinal section of a magnetic head 241 of the 12th embodiment are formed into an inverse L-shape. A touching head portion 241a is an upper part of the head 241 and projecting forward. At the center of the touching head portion 241a, a gap portion 242a formed of a core 242b stored in a cover case 243 is exposed and pressed on a magnetic information recording portion of a film 208. The front of the touching head portion 241a is formed like an arc in the film travelling direction. A surface containing an gap portion 242a is ground to be a plane with the cover case. In the cover case 243, as shown in FIG. 36, a front core 242b forming the gap portion 242a and a back core 242c wound by a coil 244 are joined and fixed at a surface 242d ground at 45° to make both cores 242b and 242c an inverse L-shape and stored. A connecting terminal 245 which is projecting from the back of the head is connected to the coil 244. These parts are fixed in the cover case 243 by filling up the case with sealing material.

The cover case 243 is processed so as to be an inverse L-shape by a drawing process in accordance with the shape of the inner core. A projection width size L1 (seen FIG. 37) of a touching head portion 241a containing a gap portion 242a is formed to be a size as small as possible while the size satisfies a required track width. In this magnetic head, such a small size makes a touched area small when the head portion 241 touches film and makes travelling resistance decrease and edges of perforations do not reduce the life of a head.

FIG. 36 shows a using state of the magnetic head 241 of this embodiment. The touching head portion 241a presses a magnetic information recording portion on which the outside of the perforations 208a on a reverse side of the film 208 are magnetically coated. In a camera unit 246, a film rail surface 246a and a pressure plate rail surface 246b are arranged across an aperture 246c of a picture plane. The film rail surface 246a is a guide rail for determining a flange back of a camera. The pressure plate rail surface 246b is a guide rail for pressing a pressure plate 247. A space between the pressure plate 247 and film rail surface 246a is a space for travelling the film 208 and a tunnel-like groove is produced to support the film.

In a part of the camera unit 246 facing the magnetic head 241, the aperture 246c is bored. From the aperture 246c, a part of the film pressing roller 248 goes in and out. The film pressing roller 248 is prevented from coming off from a supporting axis 250 fixed to a supporting plate 249 by a preventing ring and is rotatably supported. Then, the supporting plate 249 moves in the direction shown by an arrow by a moving mechanism (not illustrated) operated with film transportation. The film pressing roller 248 is usually located in a position retreated from the aperture 246c. The roller 248 is exposed and moved so as to be projecting from the aperture 246c and presses against the film before a signal enters a film transportation operation. Then, the magnetic information recording portion is pressed on the magnetic head 241 by a specified pressure.

The film pressing roller 248 is made of an elastic member, such as soft plastic or rubber. The roller 248 can be produced without adjusting the positions of the roller and the magnetic head and the quantity of connecting force finely. In addition, unevenness of recording and reproducing signals can be controlled.

If the magnetic head 241 is formed into an inverse L-shape in this way and further formed into a flat shape, film cannot be damaged and the life of the head can be extended. In addition, the head can be loaded in the back cover by avoiding a projection of a pressure plate rail or a film guiding member, so that the magnetic head can be combined in a camera without remarkably changing the shape of the camera unit.

A single-lens reflex camera in which a back cover can be freely exchanged by a user has been sold. If such a camera is combined with a back cover having a circuit and operation part being able to perform magnetic recording by adopting the aforesaid head, there is merit in that the film enabling to be magnetically recorded is used for the former single-lens reflex camera to make magnetic recording possible.

In the 11th embodiment, a surface other than a magnetic information recording surface is formed of slopes 231b, 231c, 231d and 231f (see FIG. 34) separating from a photographic film surface and planes. However, instead of these slopes and planes, the surface may be a part of an arc spherical surface like a touching head portion 241a as the head 241 of the embodiment shown in FIG. 37.

According to the eighth, ninth, 10th 11th and 12th embodiments, this invention has an remarkable effect in which the performance of a camera is not lowered to a considerable degree and the life of a battery is lengthened because there is no anxiety in that a picture plane is damaged and film travelling resistance can be reduced. In the aforesaid embodiments, a magnetic information recording portion is provided outside perforations of film is explained. However, a range to which the magnetic head is applied is not restricted by the explanation. The magnetic head may be used for a type for recording data between perforations.

What is claimed is:

1. A camera using photographic film containing a magnetic information recording portion, means for pressing against the magnetic information recording portion when the film is transported, and having a magnetic head arranged to face one surface of the film for magnetically recording or reproducing data, comprising:

a cover case housing the magnetic head and having an opening surrounding and exposing a portion of the magnetic head having an air gap to permit engagement of said portion with said magnetic information recording portion for reproducing or recording;

the magnetic head being tapered in a direction separating from said film so that all surface portions of the cover case facing the magnetic information recording portion and surrounding said opening, are inclined away from a photographic picture plane of said film; and a rotary roller arranged on an opposite surface of the film relative to the magnetic head for pressing the magnetic information recording portion of the film against the exposed portion of the magnetic head, the rotary roller arranged near a film travelling quantity detecting member rotating responsive to film movement.

2. A magnetic recording or reproducing apparatus having a magnetic head being pressed against a magnetic information recording portion when a magnetic information recording medium is transported, said magnetic information recording portion having a substantially planar surface at a location where it passes said information recording medium, and the magnetic head magnetically recording or reproducing data comprising:

the magnetic head having a substantially planar front core portion forming a gap portion for magnetically recording and reproducing and a substantially planar back core portion connected to the front core portion to form a substantially closed-loop core and a coil wound about said back core portion for carrying magnetic recording or reproducing signal currents;

said front and back core portions being inclined relative to one another to define an approximate L-shaped configuration;

said front and back core portions each being substantially C-shaped;

said front core portion having a pair of joining legs extending away from said gap portion;

said back core portion having a pair of joining legs extending away from a center portion receiving said coil;

an end of each of the joining legs of the front core portion being joined to an end of one of the joining legs of the back core portion whereby the joined legs form said substantially L-shaped configuration; and the joining legs of the front core portion being substantially perpendicular to the planar surface of said recording medium and the joining legs of the back core portion being aligned transverse to the planar surface of said recording medium.

3. A camera according to claim 2, wherein the front core portion and the back core portion are fitted and fixed at a bending portion forming the L-shape.

4. A camera according to claim 3, wherein the front core portion and the back core portion are fitted by slopes each of which having an approximate angle of 45° with each other.

5. A camera according to claim 2, wherein, in the L-shaped side, the front core portion meets with the back core portion at an angle of 45° or less.

6. A camera using photographic film containing a magnetic information recording portion, magnetic means pressing against the magnetic information recording portion when the film is transported, and having a magnetic head for magnetically recording or reproducing data, comprising:

a cover case housing the magnetic head and having an opening surrounding and exposing a portion of the magnetic head having an air gap to permit engagement of said portion with said magnetic information recording portion for reproducing or recording;

the magnetic head being tapered in a direction separating from the film so that all surface portions of the cover case surrounding the opening and facing the film are inclined in a direction away from a photographic picture plane of the film.

7. A camera using photographic film containing a magnetic information recording portion, magnetic means pressing against the magnetic information recording portion when the film is transported, and having a magnetic head for magnetically recording or reproducing data, comprising:

the magnetic head consisting of a magnetic head unit and a cover case;

the cover case housing the magnetic head and having an opening surrounding and exposing a portion of the magnetic head having an air gap to permit engagement of said portion with said magnetic information recording portion for reproducing or recording;

the cover case being tapered in a direction separating from the film so that all surface portions of the cover case surrounding the opening and facing the film are inclined away from a photographic picture plane of the film; and the magnetic head unit consisting of a substantially planar front core portion forming a gap portion for magnetic recording and reproducing and a substantially planar back core portion connected to the front core portion to form a substantially closed loop core and having a coil wound about said back core portion for carrying magnetic recording or reproducing signal currents, said front and back core portions being inclined relative to one another wherein an end view of the front core portion and the back core portion defines an approximate L-shape.

8. A camera using photographic film containing a magnetic information recording portion, magnetic means pressing against the magnetic information recording portion when the film is transported, and having a magnetic head arranged to face one surface of the film for magnetically recording or reproducing data, comprising:

a cover case housing the magnetic head and having an opening surrounding and exposing a portion of the magnetic head having an air gap to permit engagement of said portion with said magnetic information recording portion for reproducing or recording;

the magnetic head being tapered in a direction separating from the film so that all surface portions of the cover case surrounding said opening and facing the magnetic information recording portion are inclined away from a photographic picture plane of the film; and a rotary roller arranged on an opposite surface of the film relative to the magnetic head to press the magnetic recording portion of the film against the magnetic head, the rotary roller arranged near a film entrance and exit of a film patrone containing film.

\* \* \* \* \*